(12) United States Patent
Iwase et al.

(10) Patent No.: US 11,892,705 B2
(45) Date of Patent: Feb. 6, 2024

(54) OPTICAL UNIT, SMARTPHONE, AND MANUFACTURING METHOD OF OPTICAL UNIT

(71) Applicant: NIDEC CORPORATION, Kyoto (JP)

(72) Inventors: Takayuki Iwase, Kyoto (JP); Tomohiro Egawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 126 days.

(21) Appl. No.: 17/702,801

(22) Filed: Mar. 24, 2022

(65) Prior Publication Data

US 2022/0317414 A1 Oct. 6, 2022

(30) Foreign Application Priority Data

Mar. 30, 2021 (JP) ................. 2021-058349

(51) Int. Cl.
*G02B 7/18* (2021.01)
(52) U.S. Cl.
CPC ................. *G02B 7/1805* (2013.01)
(58) Field of Classification Search
CPC ........ G02B 7/1805; G02B 7/182; G02B 5/06; G02B 13/001; G02B 13/0065; G02B 27/646; G02B 5/04; H04N 23/685
USPC ........................................ 359/833
See application file for complete search history.

(56) References Cited

U.S. PATENT DOCUMENTS

| | | | | |
|---|---|---|---|---|
| 11,493,780 B2* | 11/2022 | Tanaka | ................. | G02B 27/646 |
| 11,523,040 B2* | 12/2022 | Iwase | ..................... | G02B 7/023 |
| 11,543,674 B2* | 1/2023 | Sazai | ....................... | G03B 5/00 |
| 11,630,320 B2* | 4/2023 | Sazai | ................... | G02B 27/646 359/557 |
| 11,640,041 B2* | 5/2023 | Arai | ..................... | G02B 7/1805 359/831 |
| 11,747,642 B2* | 9/2023 | Egawa | ............... | G02B 26/0816 359/554 |
| 2019/0227300 A1 | 7/2019 | Tsai et al. | | |
| 2020/0363626 A1* | 11/2020 | Seo | ........................ | G03B 30/00 |
| 2021/0063848 A1* | 3/2021 | Fan | ........................ | G01B 11/24 |
| 2022/0082902 A1* | 3/2022 | Iwase | ...................... | G03B 3/06 |
| 2022/0099922 A1* | 3/2022 | Arai | ...................... | H04N 23/55 |
| 2022/0187566 A1* | 6/2022 | Xu | ....................... | G02B 7/1805 |

(Continued)

FOREIGN PATENT DOCUMENTS

| | | |
|---|---|---|
| CN | 208984869 U | 6/2019 |
| CN | 209311846 U | 8/2019 |
| CN | 107783244 B | 10/2019 |

*Primary Examiner* — Ricky D Shafer
(74) *Attorney, Agent, or Firm* — HAUPTMAN HAM, LLP

(57) ABSTRACT

An optical unit includes an optical element, a holder, a support portion, a swing mechanism, and an elastic portion. The optical element changes the traveling direction of light. The holder holds the optical element. The support portion supports the holder swingably about a swing axis. The swing mechanism swings the holder with respect to the support portion about the swing axis. The elastic portion connects the holder and the support portion. The support portion has a pair of side surface portions on both sides of the holder along the swing axis, and a connection portion connecting the side surface portions with the elastic portion between the holder and the side surface portions. The elastic portion has a convex or concave portion that comes into contact with a concave or convex portion of at least one of the holder and the support portion.

13 Claims, 21 Drawing Sheets

(56) References Cited

U.S. PATENT DOCUMENTS

2022/0283404 A1\* 9/2022 Minamisawa ....... G02B 27/646
2022/0317415 A1\* 10/2022 Iwase ................... G02B 7/1805

\* cited by examiner

OPTICAL UNIT, SMARTPHONE, AND MANUFACTURING METHOD OF OPTICAL UNIT

CROSS-REFERENCE TO RELATED APPLICATIONS

The present invention claims priority under 35 U.S.C. § 119 to Japanese Patent Application No. 2021-058349 filed on Mar. 30, 2021, the entire content of which is incorporated herein by reference.

FIELD OF THE INVENTION

The present disclosure relates to an optical unit, a smartphone, and a manufacturing method of an optical unit.

BACKGROUND

Image blur may occur due to camera shake during capturing a still image or moving image with a camera. An image stabilizer for enabling capturing of a clear image by suppressing the image blur has been put into practical use. When the camera shakes, the image stabilizer suppresses the image blur by correcting the attitude of a camera module in response to the camera shake.

There is conventionally known a prism device that includes a prism, a prism table on which the prism is installed, and a support shaft, and is used for an imaging module. The prism seat is rotatable about one support shaft.

However, it is conceivable that in the conventional prism device, the support shaft or the prism table moves in the axial direction of the support shaft due to a dimensional error at the time of manufacturing. Specifically, in order to be able to assemble the prism device even when there is a dimensional error, each member is manufactured so that a clearance equal to or greater than the dimensional error occurs. Therefore, it is difficult to suppress the prism table from being displaced in the axial direction of the support shaft.

SUMMARY

An exemplary optical unit of the present disclosure includes an optical element, a holder, a first support portion, a first swing mechanism, and an elastic portion. The optical element changes a traveling direction of light. The holder holds the optical element. The first support portion supports the holder swingably about a first swing axis. The first swing mechanism swings the holder about the first swing axis with respect to the first support portion. The elastic portion connects the holder and the first support portion. The first support portion has a pair of side surface portions and a connection portion. The pair of side surface portions are arranged on both sides of the holder in the axial direction of the first swing axis. The connection portion connects the pair of side surface portions. The elastic portion is arranged between the holder and the side surface portion. The elastic portion has a convex portion that protrudes toward at least one of the holder and the first support portion, or a concave portion that is recessed on the side opposite to at least one of the holder and the first support portion. At least one of the holder and the first support portion has a concave portion recessed on the side opposite to the elastic portion or a convex portion protruding toward the elastic portion. The convex portion or the concave portion of the elastic portion comes into contact with the concave portion or the convex portion of at least one of the holder and the first support portion.

Another exemplary smartphone of the present disclosure has the optical unit described above.

Another exemplary manufacturing method of an optical unit of the present disclosure is a manufacturing method of an optical unit having an optical element, a holder, a first support portion, a first swing mechanism, and an elastic portion. The optical element changes a traveling direction of light. The holder holds the optical element. The first support portion supports the holder swingably about a first swing axis. The first swing mechanism swings the holder about the first swing axis with respect to the first support portion. The elastic portion connects the holder and the first support portion. The first support portion has a pair of side surface portions and a connection portion. The pair of side surface portions are arranged on both sides of the holder in the axial direction of the first swing axis. The connection portion connects the pair of side surface portions. The manufacturing method of the optical unit includes a process of attaching the optical element to the holder, a process of arranging the elastic portion at an end portion of the axial direction of the holder, and a process of arranging the holder and the elastic portion between the pair of side surface portions of the first support portion. In the process of arranging the holder and the elastic portion, the elastic portion is arranged between the holder and the side surface portion, and the convex portion or the concave portion included in the elastic portion comes into contact with the concave portion or the convex portion included in at least one of the holder and the first support portion. The convex portion of the elastic portion protrudes toward at least one of the holder and the first support portion. The concave portion of the elastic portion is recessed on the side opposite to at least one of the holder and the first support portion. The concave portion of at least one of the holder and the first support portion is recessed on the side opposite to the elastic portion. The convex portion of at least one of the holder and the first support portion protrudes toward the elastic portion.

The above and other elements, features, steps, characteristics and advantages of the present disclosure will become more apparent from the following detailed description of the preferred embodiments with reference to the attached drawings.

DETAILED DESCRIPTION

Figure 1:
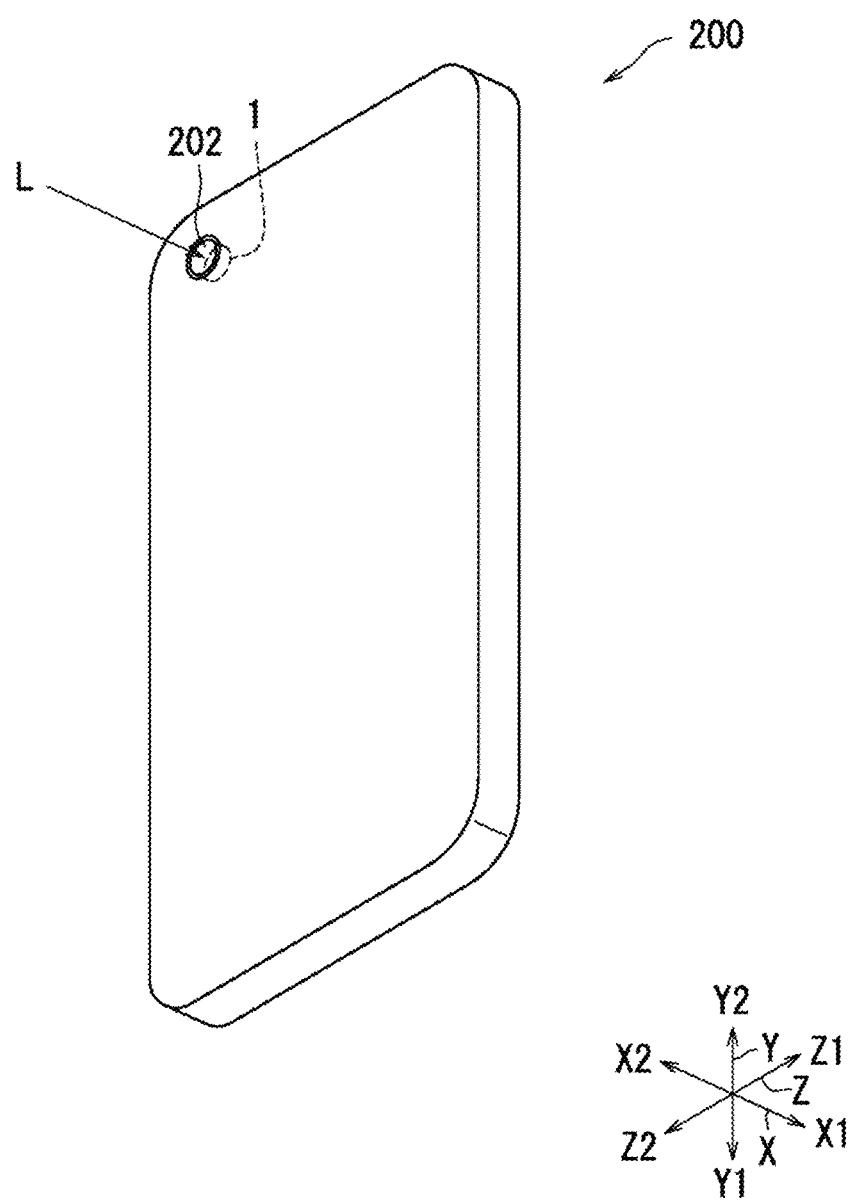
FIG. 1 is a perspective view schematically showing a smartphone including an optical unit according to an embodiment of the present disclosure.

An embodiment as an example of the present disclosure will be described below with reference to the drawings. In the drawings, the same or corresponding parts are given the same reference signs and description thereof will not be repeated.

In the present description, the first direction X, a second direction Y, and a third direction Z intersecting one another are appropriately described for easy understanding. In the present description, the first direction X, the second direction Y, and the third direction Z are orthogonal to one another, but are not necessarily orthogonal to one another. One side in the first direction is referred to as the one side X1 in the first direction X, and the other side in the first direction is referred to as the other side X2 in the first direction X. One side in the second direction is referred to as one side Y1 in the second direction Y, and the other side in the second direction is referred to as the other side Y2 in the second direction Y. One side in the third direction is referred to as one side Z1 in the third direction Z, and the other side in the third direction is referred to as the other side Z2 in the third direction Z. For convenience, the first direction X is sometimes described as an up-down direction.

The one side X1 in the first direction X indicates a downward direction, and the other side X2 in the first direction X indicates an upward direction. However, the up-down direction, the upward direction, and the downward direction are defined for convenience of the description, and do not necessarily coincide with the vertical direction. The up-down direction is defined just for convenience of the description, and does not limit an orientation during use and assembly of the optical unit according to the present disclosure.

First, an example of application of an optical unit 1 will be described with reference to FIG. 1. FIG. 1 is a perspective view schematically showing a smartphone 200 including the optical unit 1 according to an embodiment of the present disclosure. The smartphone 200 has the optical unit 1. The optical unit 1 reflects incident light in a certain direction. As shown in FIG. 1, the optical unit 1 is suitably used as, for example, an optical component of the smartphone 200. Note that the application of the optical unit 1 is not limited to the smartphone 200, and can be used for various devices such as a digital camera and a video camera.

The smartphone 200 includes a lens 202 on which light is incident. In the smartphone 200, the optical unit 1 is arranged inside relative to the lens 202. When light L enters the inside of the smartphone 200 via the lens 202, a traveling direction of the light L is changed by the optical unit 1. The light L is imaged by an imaging element (not illustrated) via a lens unit (not illustrated).

Figure 2:
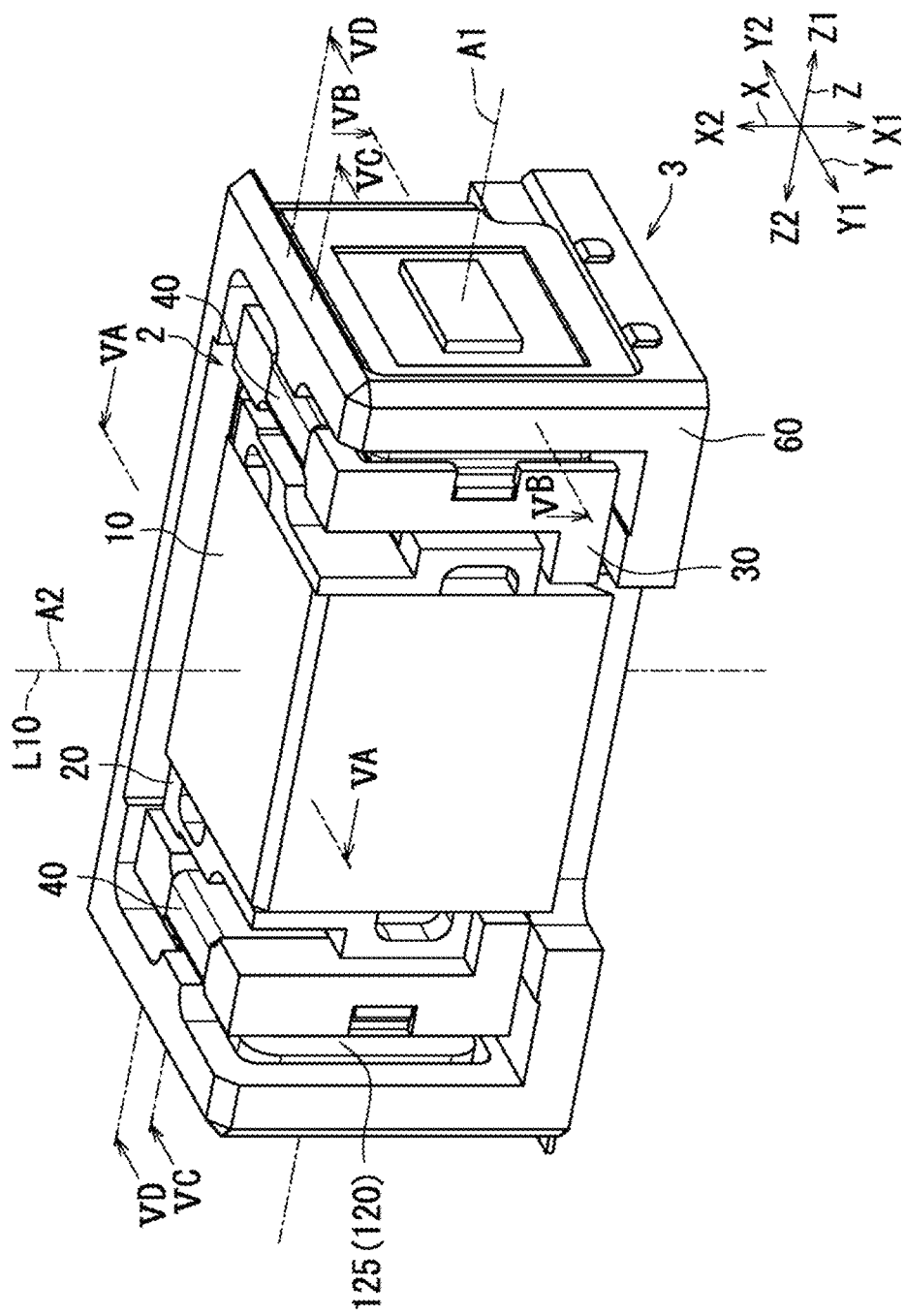
FIG. 2 is a perspective view showing the optical unit of the present embodiment.
Figure 3:
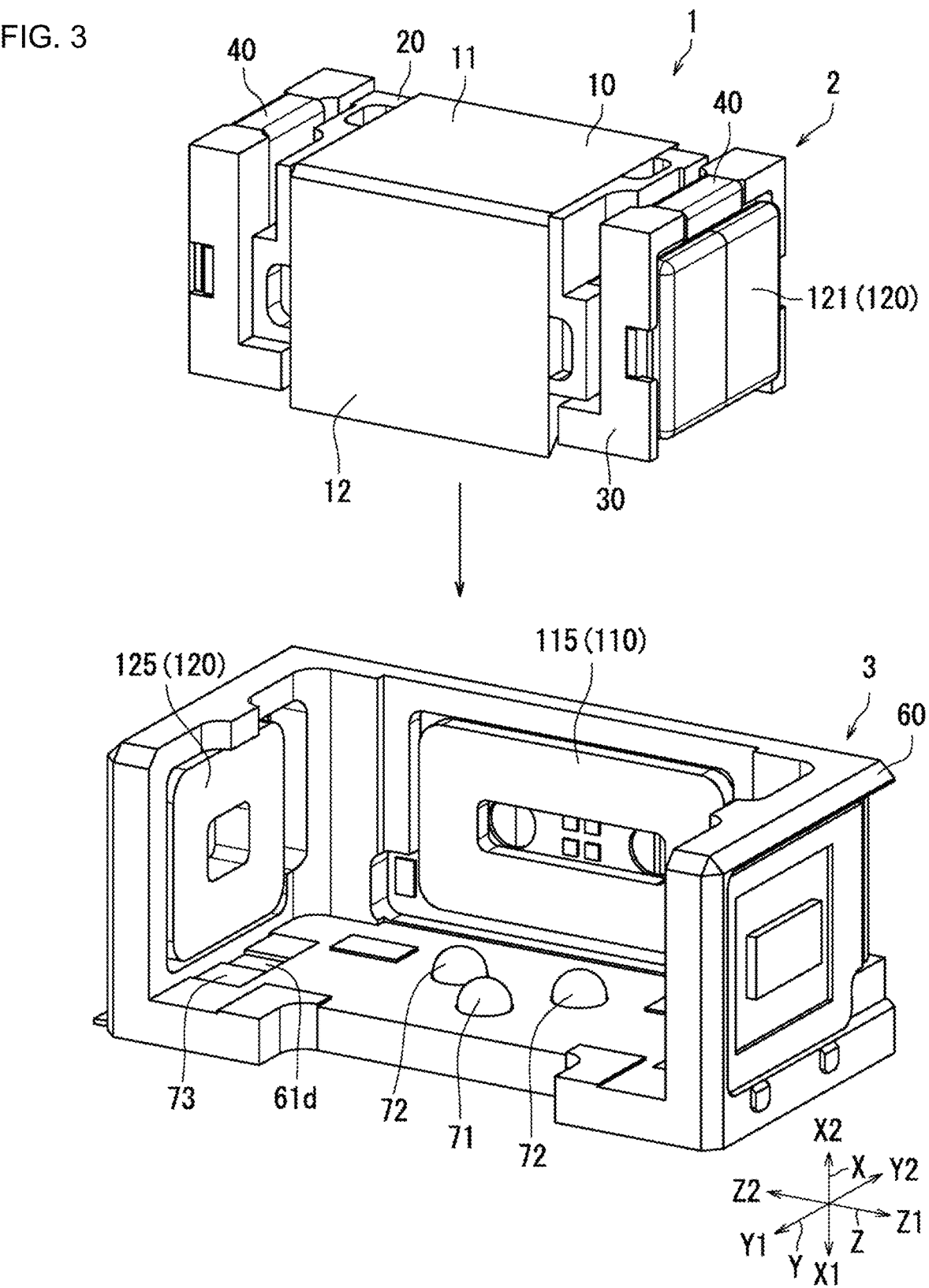
FIG. 3 is an exploded perspective view of the optical unit according to the present embodiment in which the optical unit is separated into a movable body and a support body.

Next, the optical unit 1 will be described with reference to FIGS. 2 to 14. FIG. 2 is a perspective view showing the optical unit 1 according to the present embodiment. FIG. 3 is an exploded perspective view of the optical unit 1 according to the present embodiment in which the optical unit 1 is separated into a movable body 2 and a support body 3. As shown in FIGS. 2 and 3, the optical unit 1 includes at least an optical element 10, a holder 20, a first support portion 30, a first swing mechanism 110, and a first preload portion 40. In the present embodiment, the optical unit 1 further includes a second support portion 60 and a second swing mechanism 120. Note that the first preload portion 40 is an example of the "elastic portion" of the present disclosure. The details will be described below.

Figure 4:
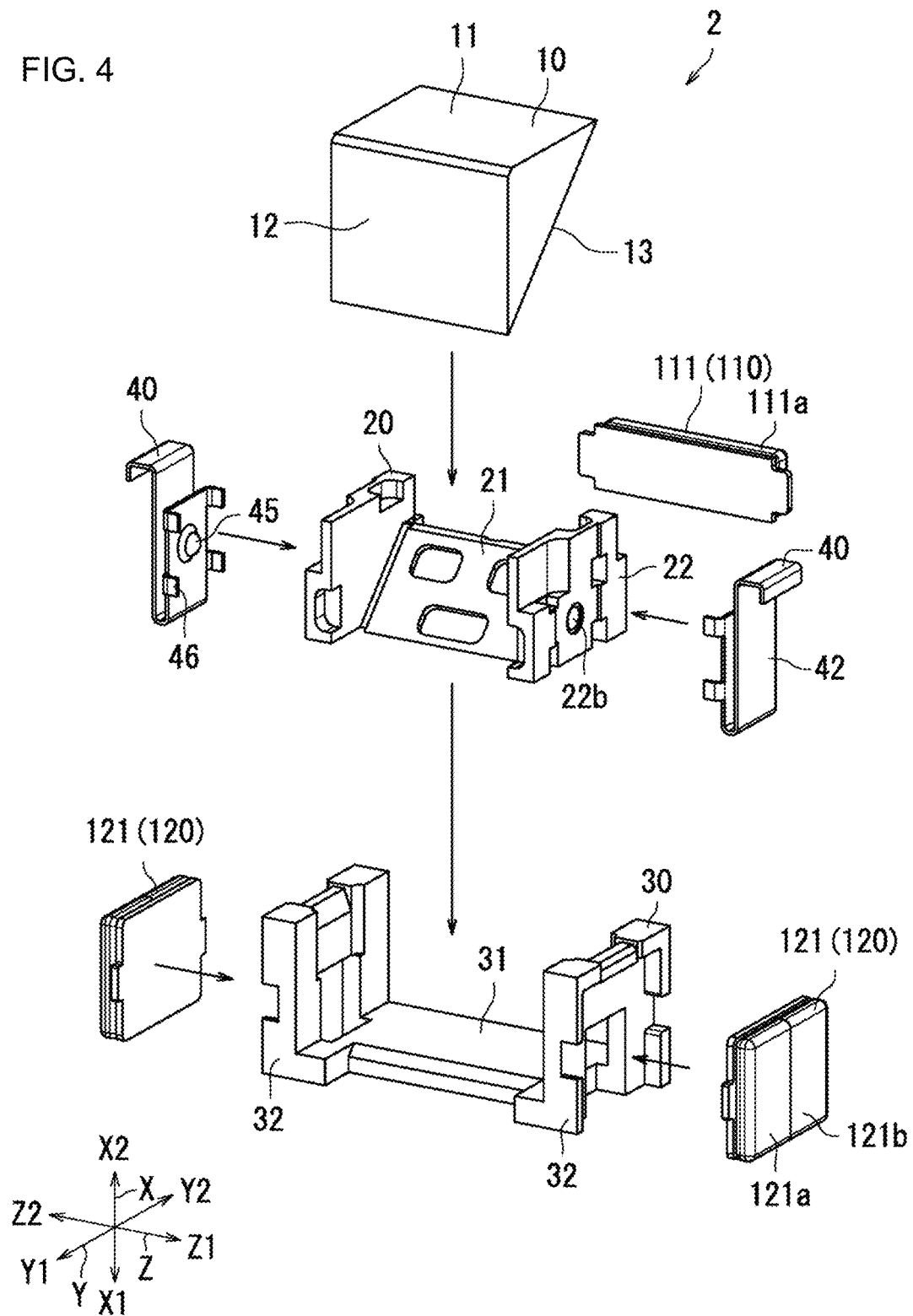
FIG. 4 is an exploded perspective view of the movable body of the optical unit according to the present embodiment.

FIG. 4 is an exploded perspective view of the movable body 2 of the optical unit 1 according to the present embodiment. As shown in FIGS. 2 to 4, the optical unit 1 includes the movable body 2 and the support body 3. The support body 3 supports the movable body 2 swingably about a second swing axis A2.

The movable body 2 has the optical element 10. The movable body 2 has the holder 20 and the first support portion 30. The movable body 2 has the first preload portion 40. The optical element 10 changes the traveling direction of light. The holder 20 holds the optical element 10. The first support portion 30 supports the holder 20 and the optical element 10 swingably about a first swing axis A1. The first support portion 30 is supported by the support body 3 swingably about the second swing axis A2. More specifically, the first support portion 30 is supported by the second support portion 60 of the support body 3 swingably about the second swing axis A2.

That is, the holder 20 is swingable with respect to the first support portion 30, and the first support portion 30 is swingable with respect to the second support portion 60. Therefore, since it is possible to swing the optical element 10 about each of the first swing axis A1 and the second swing axis A2, it is possible to correct the attitude of the optical element 10 about each of the first swing axis A1 and the second swing axis A2. Therefore, image blur can be suppressed in two directions. As a result, the correction accuracy can be improved as compared with a case in which the optical element 10 is swung about only one swing axis. Note that the first swing axis A1 is also referred to as a pitching axis. The second swing axis A2 is also referred to as a roll axis.

The first swing axis A1 is an axis extending along the third direction Z intersecting the first direction X and the second direction Y. The second swing axis A2 is an axis extending along the first direction X. Therefore, the optical element 10 can be swung about the first swing axis A1 intersecting the first direction X and the second direction Y. The optical element 10 can be swung about the second swing axis A2 extending along the first direction X. Thus, the attitude of the optical element 10 can be appropriately corrected.

The first support portion 30 supports the holder 20 in the third direction Z. Therefore, the first support portion 30 can be easily swung about the first swing axis A1 extending along the third direction Z. Specifically, the first support portion 30 supports the holder 20 in the third direction Z via the first preload portion 40 in the present embodiment.

Figure 5A:
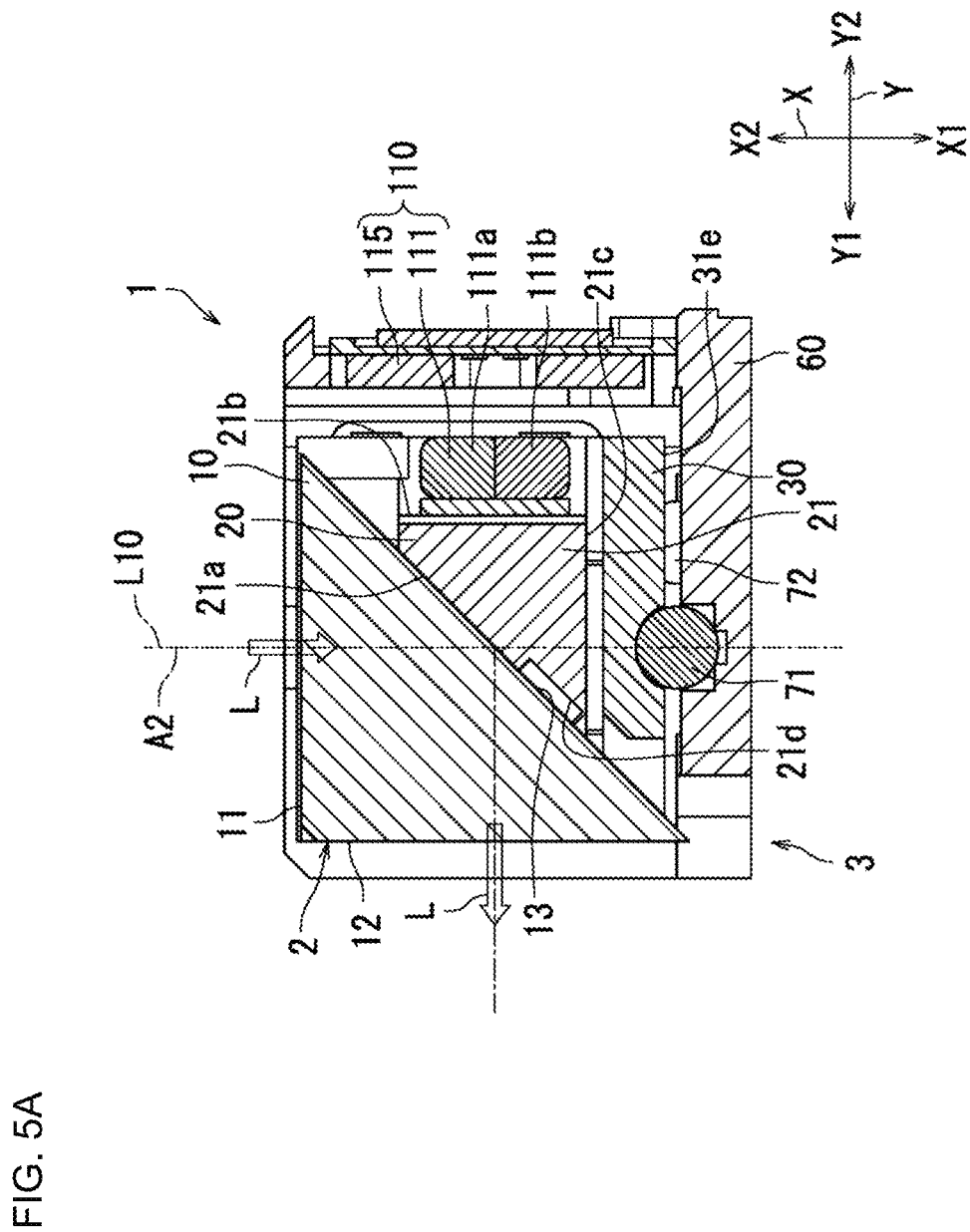
FIG. 5A is a cross-sectional view taken along line VA-VA of FIG. 2.
Figure 5B:
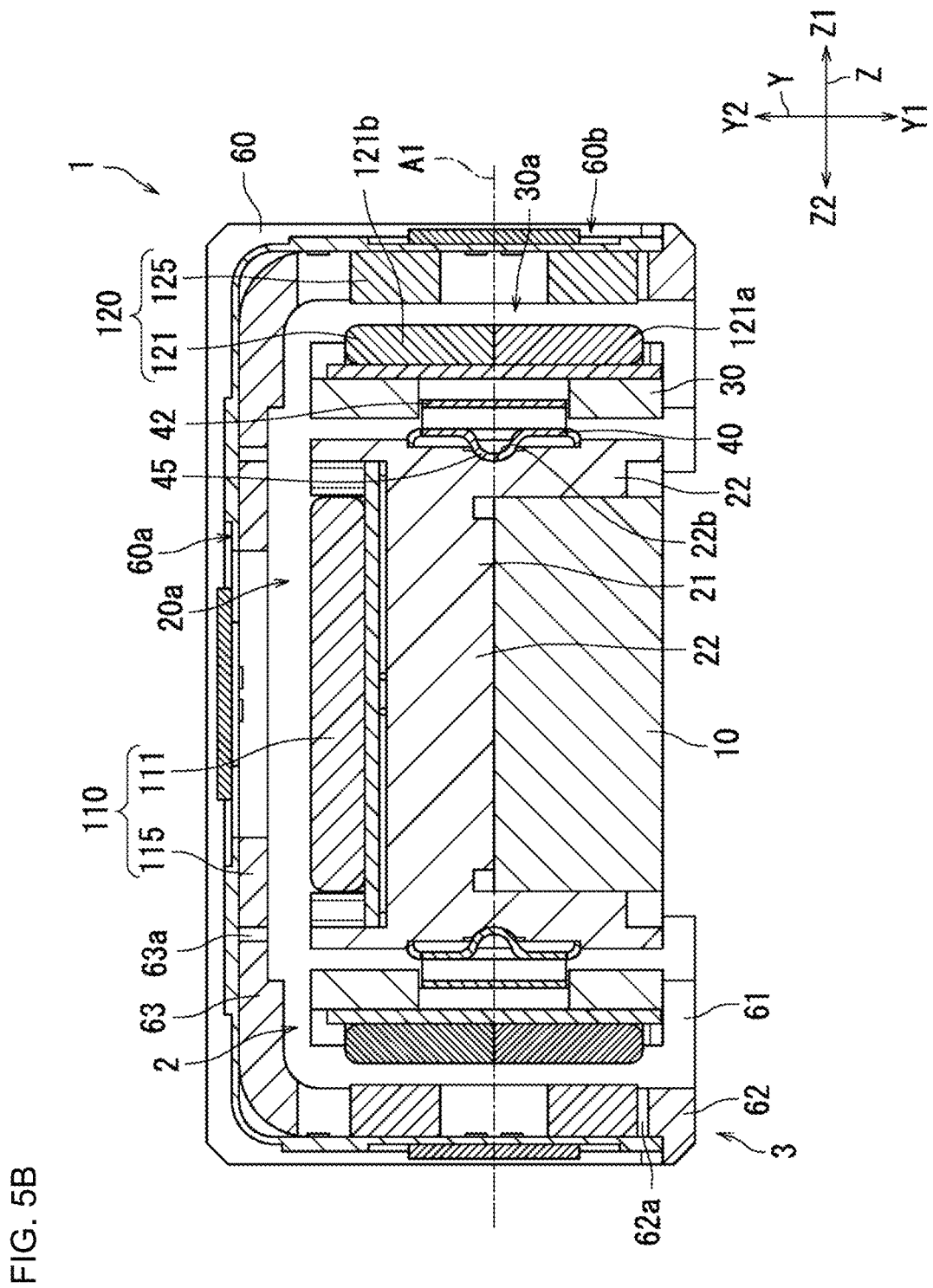
FIG. 5B is a cross-sectional view taken along line VB-VB of FIG. 2.
Figure 5C:
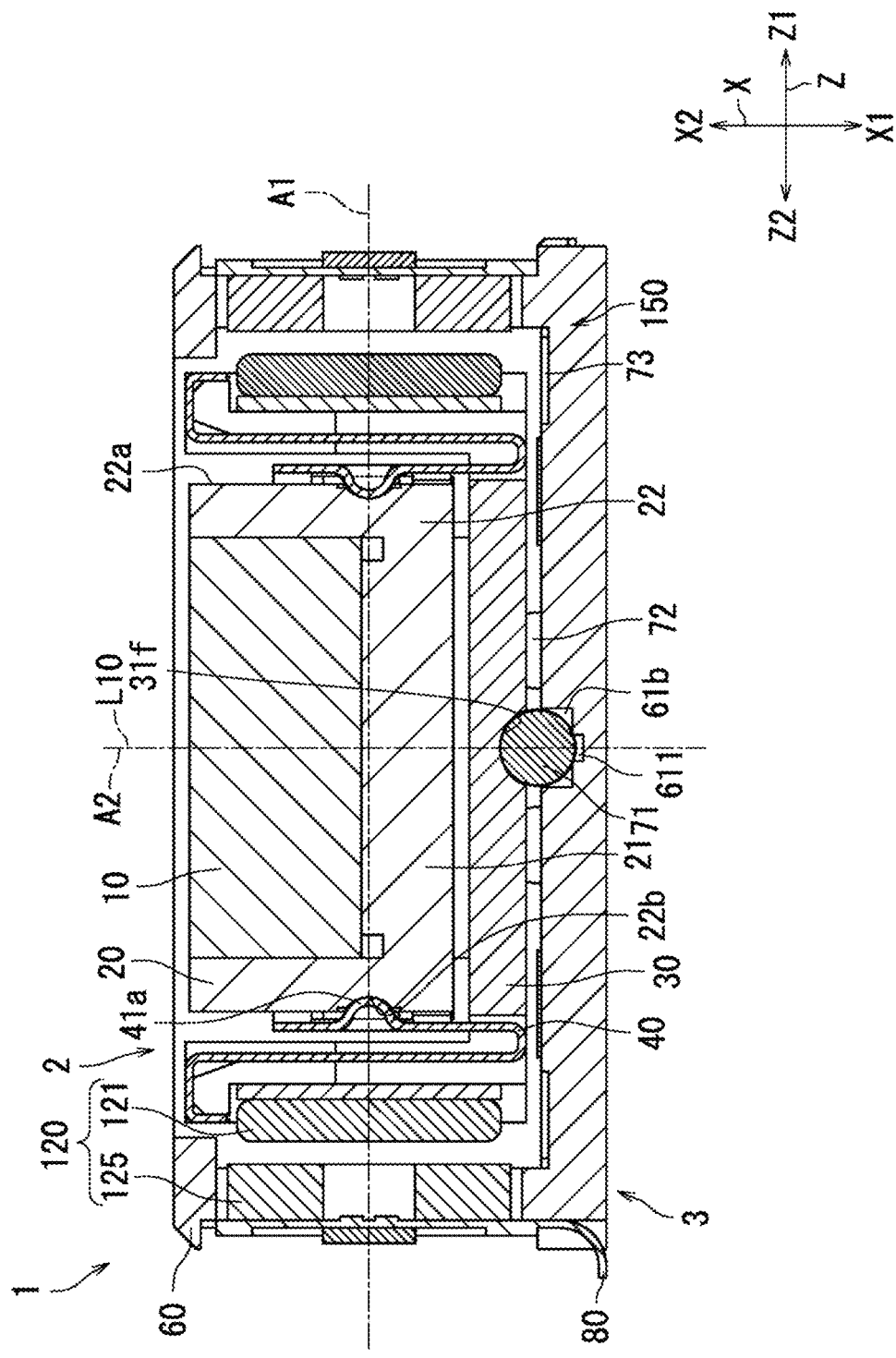
FIG. 5C is a cross-sectional view taken along line VC-VC of FIG. 2.
Figure 5D:
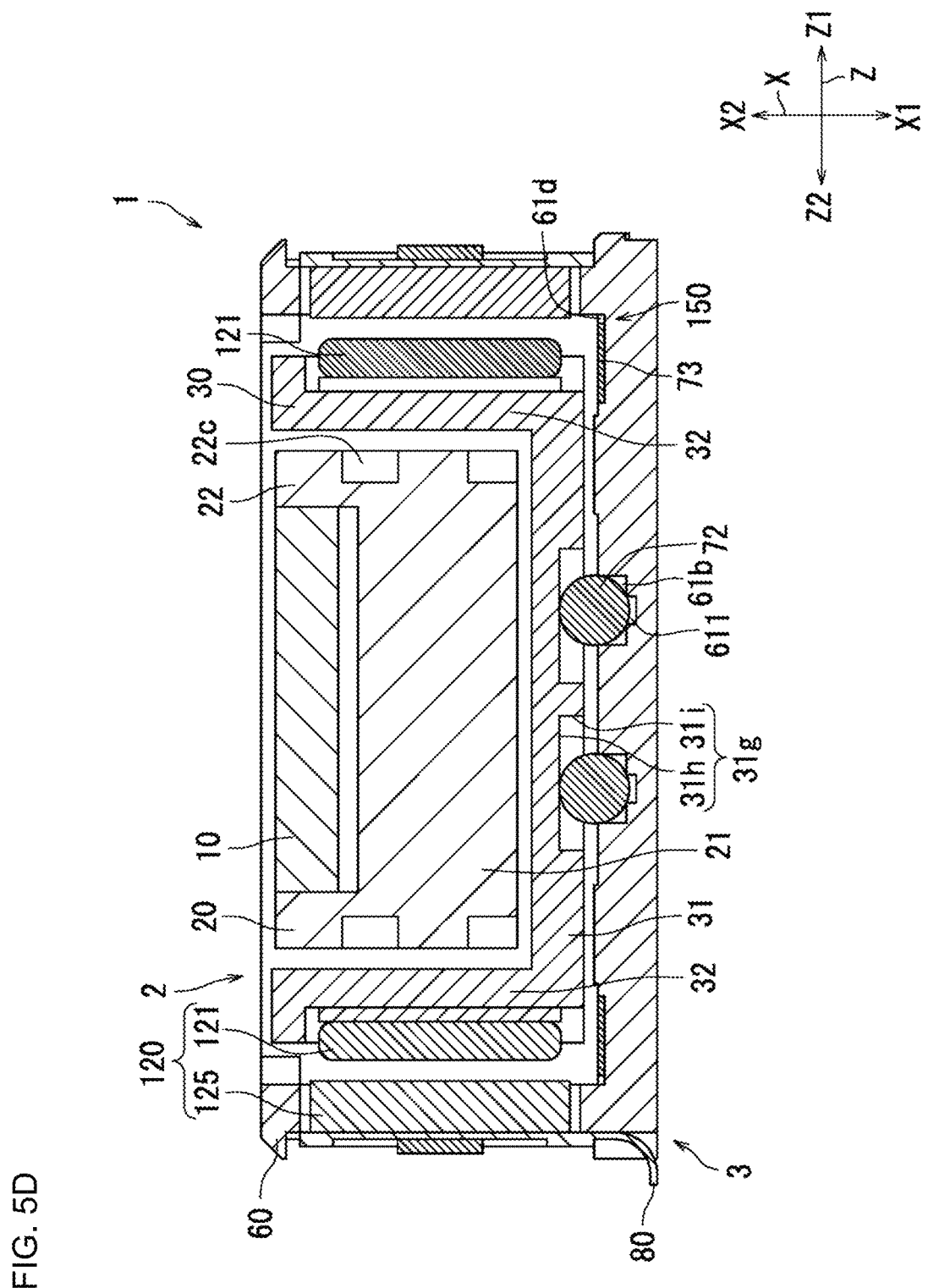
FIG. 5D is a cross-sectional view taken along line VD-VD of FIG. 2.
Figure 6:
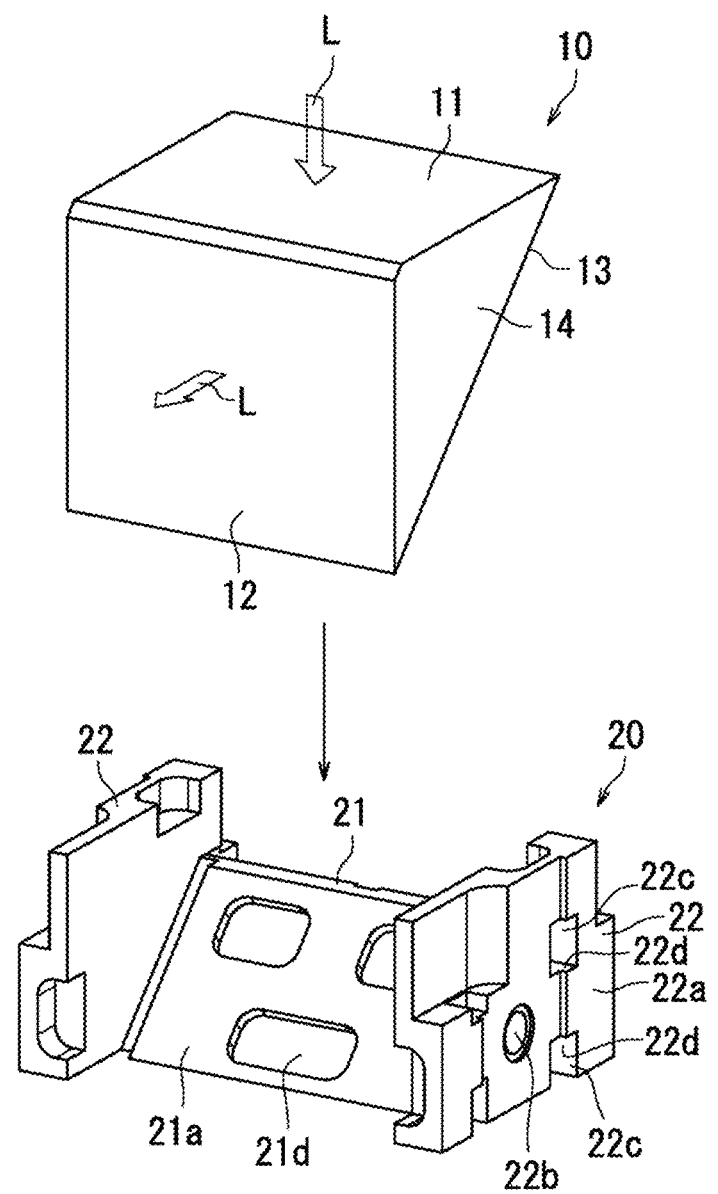
FIG. 6 is an exploded perspective view of an optical element and a holder of the optical unit according to the present embodiment.

FIG. 5A is a cross-sectional view taken along line VA-VA of FIG. 2. FIG. 5B is a cross-sectional view taken along line VB-VB of FIG. 2. FIG. 5C is a cross-sectional view taken along line VC-VC of FIG. 2. FIG. 5D is a cross-sectional view taken along line VD-VD of FIG. 2. FIG. 6 is an exploded perspective view of the optical element 10 and the holder 20 of the optical unit 1 according to the present embodiment. As shown in FIGS. 5A to 5D and 6, the optical element 10 includes a prism. The prism is made of a transparent material that has a higher refractive index than air. The optical element 10 may be, for example, a plate-shaped mirror. In the present embodiment, the optical element 10 has a substantially triangular prism shape. Specifically, the optical element 10 has a light incident surface 11, a light emission surface 12, a reflection surface 13, and a pair of side surfaces 14. The light L is incident on the light incident surface 11. The light emission surface 12 is connected to the light incident surface 11. The light emission surface 12 is arranged perpendicular to the light incident surface 11. The reflection surface 13 is connected to the light incident surface 11 and the light emission surface 12. The reflection surface 13 is inclined by about 45 degrees with respect to each of the light incident surface 11 and the light emission surface 12. That is, the reflection surface 13 reflects the light L traveling to the one side X1 in the first direction X to the one side Y1 in the second direction Y intersecting the first direction X. That is, the optical element 10 reflects the light L traveling to the one side X1 in the first direction X to the one side Y1 in the second direction Y intersecting the first direction X. The first direction X and the second direction Y are directions along the traveling direction of the light L (see FIG. 5A). Therefore, the optical element 10 can be swung about the first swing axis A1 intersecting the first direction X and the second direction Y, which is the traveling direction of the light L. As a result, the attitude of the optical element 10 can be corrected more appropriately. The pair of side surfaces 14 are connected to the light incident surface 11, the light emission surface 12, and the reflection surface 13.

An optical axis L10 of the optical element 10 and the second swing axis A2 are arranged to overlap each other. In the present description, the optical axis L10 of the optical element 10 means an axis an axis that coincides with at least any of an axis perpendicular to the light incident surface 11 of the optical element 10 and passing through the center of the reflection surface 13, the light axis of the lens 202 on which light is incident, an axis passing through an intersection between the optical axis of the lens unit present at the reflection destination and the reflection surface 13 and extending in a direction perpendicular to the optical axis of the lens unit, and an axis passing through an intersection between a straight line passing through the center of the imaging element and the reflection surface 13 and extending in a direction perpendicular to a straight line passing through the imaging element. Typically, an axis perpendicular to the light incident surface 11 of the optical element 10 and passing through the center of the reflection surface 13, the light axis of the lens 202 on which light is incident, an axis passing through an intersection between the optical axis of the lens unit present at the reflection destination and the reflection surface 13 and extending in a direction perpendicular to the optical axis of the lens unit, and an axis passing through an intersection between a straight line passing through the center of the imaging element and the reflection surface 13 and extending in a direction perpendicular to a straight line passing through the imaging element all coincide with one another.

At least one of the holder 20 and the first support portion 30 has a concave portion recessed on the side opposite to the first preload portion 40 or a convex portion protruding toward the first preload portion 40. In the present embodiment, the holder 20 has an axial concave portion 22b that is recessed on the side opposite to the first preload portion 40. Note that the axial concave portion 22b is an example of the "concave portion" of the present disclosure.

Specifically, the holder 20 is made of, for example, resin. The holder 20 includes a holder body 21 and a pair of side surface portions 22. The holder 20 includes a pair of opposing side surfaces 22a and the axial concave portion 22b.

The holder body 21 extends in the third direction Z. The holder body 21 has a support surface 21a and a plurality of concave portions 21d. The holder body 21 has three concave portions 21d in the present embodiment. The support surface 21a supports the optical element 10. The support surface 21a is a surface that faces the reflection surface 13 of the optical element 10 and is connected to the pair of side surface portions 22. The support surface 21a is an inclination surface inclined by about 45 degrees with respect to the incident direction of the light L, and is in contact with the reflection surface 13 of the optical element 10 over substantially the entire area of the inclination surface. The incident direction of the light L is a direction toward the one side X1 in the first direction X. The concave portion 21d is arranged on the support surface 21a. The concave portion 21d is recessed on the side opposite to the optical element 10. The holder body 21 does not need to have the concave portion 21d.

The holder body 21 has a back surface 21b and a lower surface 21c. The back surface 21b is connected to the support surface 21a at an end portion on the side opposite to the emission direction of the light L. Note that the "emission direction of the light L" is the one side Y1 in the second direction Y. The "end portion on the side opposite to the emission direction of the light L" is the end portion on the other side Y2 in the second direction Y. The lower surface 21c is connected to the support surface 21a and the back surface 21b.

The pair of side surface portions 22 extend in an intersection direction intersecting the third direction Z from the holder body 21. The intersection direction includes, for example, the first direction X and the second direction Y.

The pair of side surface portions 22 are arranged at both ends of the holder body 21 in the third direction Z. The pair of side surface portions 22 have shapes symmetrical to each other in the third direction Z. The pair of opposing side surfaces 22a are arranged on the pair of side surface portions 22, respectively. The pair of opposing side surfaces 22a oppose a pair of the first preload portions 40, respectively. A detailed structure of the first preload portion 40 will be described later. The axial concave portion 22b is arranged on the opposing side surface 22a. The axial concave portion 22b is recessed toward the inside of the holder 20 on the first swing axis A1. The axial concave portion 22b accommodates at least a part of an axial convex portion 45 of the first preload portion 40. The axial concave portion 22b has at least a part of a concave spherical surface. Note that the axial convex portion 45 is an example of the "convex portion" of the present disclosure.

One of the holder 20 and the first support portion 30 has a restriction concave portion 22c. The restriction concave portion 22c restricts a protrusion portion 46 of the first preload portion 40 from moving in a direction intersecting the first swing axis A1. Therefore, for example, even when an impact is applied in a direction intersecting the first swing axis A1, the holder 20 can be suppressed from coming off from the first support portion 30. Note that the restriction concave portion 22c is an example of the "restriction portion" of the present disclosure.

In the present embodiment, the holder 20 has the restriction concave portion 22c. Specifically, the restriction concave portion 22c is arranged on the opposing side surface 22a. The restriction concave portion 22c restricts the first preload portion 40 from moving by a predetermined distance or more along the side surface portion 22. More specifically, the restriction concave portion 22c is recessed toward the inside of the holder 20 in the third direction Z. The restriction concave portion 22c has an inner surface 22d. For example, the restriction concave portion 22c may be a concave portion in which both sides in the first direction X and both sides in the second direction Y are closed. For example, the restriction concave portion 22c may be a concave portion in which one side in the first direction X is opened or a concave portion in which one side in the second direction Y is opened.

Inside the restriction concave portion 22c, the protrusion portion 46 of the first preload portion 40 is arranged. The protrusion portion 46 of the first preload portion 40 is separated from the inner surface 22d of the restriction concave portion 22c by a predetermined distance in a state where the axial convex portion 45 is fitted in the axial concave portion 22b. On the other hand, when an impact or the like is applied to the optical unit 1 and the holder 20 is about to move in the first direction X and the second direction Y by a predetermined distance or more, the protrusion portion 46 of the first preload portion 40 comes into contact with the inner surface 22d of the restriction concave portion 22c. Therefore, it is possible to suppress the holder 20 from coming off from the first preload portion 40. In the present embodiment, for example, four restriction concave portions 22c are provided. The number of the restriction concave portions 22c may be one, but is preferably a plurality.

The optical unit 1 has the first preload portion 40. The first preload portion 40 connects the holder 20 and the first support portion 30. The first preload portion 40 is elastically deformable. The first preload portion 40 is arranged on at least one of the holder 20 and the first support portion 30. The first preload portion 40 applies preload to at least the other of the holder 20 and the first support portion 30 in an axial direction of the first swing axis A1. The axial direction of the first swing axis A1 is a direction along the third direction Z. Note that in the present description, "applying preload" means applying a load in advance.

Figure 7:
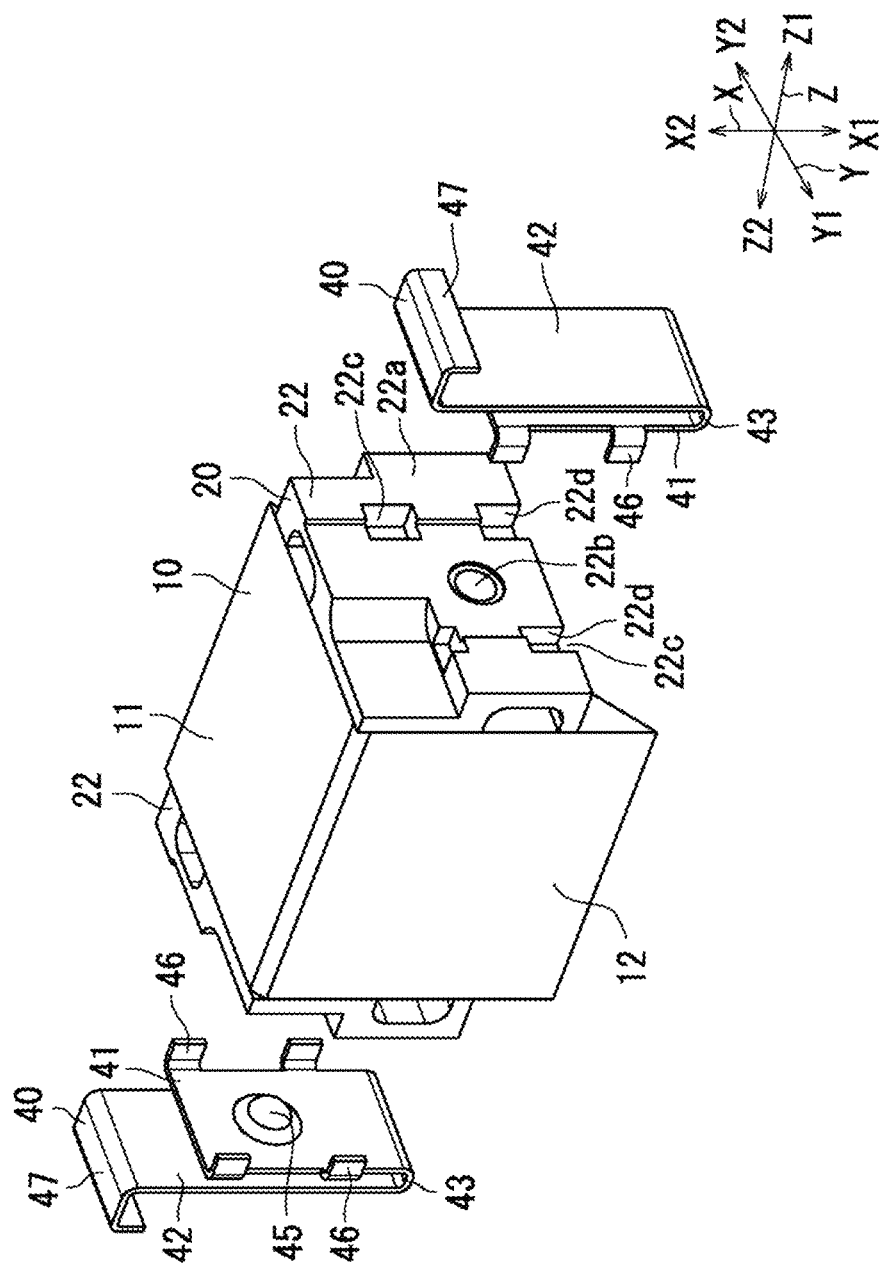
FIG. 7 is an exploded perspective view showing the optical element, the holder, and a first preload portion of the optical unit according to the present embodiment.
Figure 8:
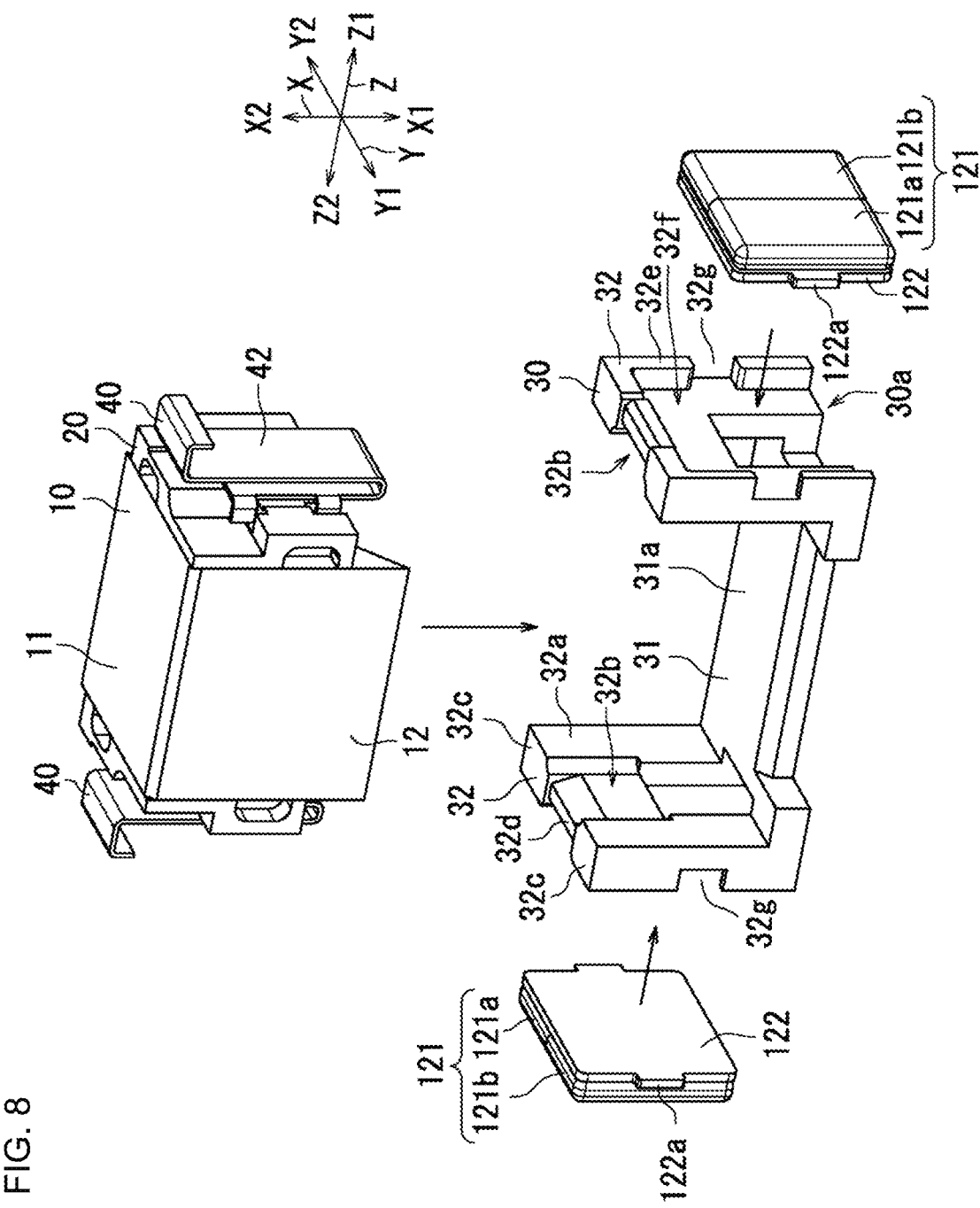
FIG. 8 is an exploded perspective view showing the optical element, the holder, the first preload portion, a first support portion, and a second magnet of the optical unit according to the present embodiment.

Next, the detailed structure of the first preload portion 40 will be described with reference to FIGS. 7 and 8. FIG. 7 is an exploded perspective view showing the optical element 10, the holder 20, and the first preload portion 40 of the optical unit 1 according to the present embodiment. FIG. 8 is an exploded perspective view showing the optical element 10, the holder 20, the first preload portion 40, the first support portion 30, and a second magnet 121 of the optical unit 1 according to the present embodiment. As shown in FIGS. 7 and 8, the first preload portion 40 is arranged between the holder 20 and the first support portion 30. Specifically, the first preload portion 40 is arranged between the holder 20 and a side surface portion 32 of the first support portion 30. Therefore, the first preload portion 40 can apply preload to the holder 20 in the axial direction of the first swing axis A1. Therefore, the holder 20 can be suppressed from moving in the axial direction of the first swing axis A1. As a result, it is possible to suppress the holder 20 from displacing in the axial direction of the first swing axis A1 with respect to the first support portion 30. Even when a manufacturing error occurs in dimensions of each member, it is possible to suppress rattling or the like from occurring in the axial direction of the first swing axis A1. In other words, for example, it is possible to suppress the position of the holder 20 from displacing in the axial direction of the first swing axis A1.

Specifically, in the present embodiment, each first preload portion 40 is a single member. The first preload portion 40 is formed by bending one plate member. The first preload portion 40 is a plate spring in the present embodiment. The first preload portion 40 is arranged on the first support portion 30.

The first preload portion 40 includes a first surface portion 41 located on the holder 20 side, a second surface portion 42 located on the first support portion 30 side, and a curved portion 43 connecting the first surface portion 41 and the second surface portion 42. Therefore, the first preload portion 40 can be easily deformed in the axial direction of the first swing axis A1. As a result, an elastic force occurs due to the bending of the curved portion 43, so that preload can be easily applied to the holder 20 in the axial direction with a simple configuration.

Specifically, the first surface portion 41 opposes the holder 20 in the axial direction of the first swing axis A1. The first surface portion 41 opposes the side surface portion 22 of the holder 20. The first surface portion 41 extends along the first direction X and the second direction Y. The first surface portion 41 is arranged along the side surface portion 22. The second surface portion 42 opposes the first support portion 30 in the axial direction of the first swing axis A1. The second surface portion 42 opposes the side surface portion 32 of the first support portion 30. The second surface portion 42 extends along the first direction X and the second direction Y. The second surface portion 42 is arranged along the side surface portion 32.

The curved portion 43 is elastically deformable. Therefore, the first surface portion 41 and the second surface portion 42 can move in a direction where they approach or separate from each other. In the present embodiment, the first preload portion 40 is compressed and deformed in the axial direction of the first swing axis A1 so that the first surface portion 41 and the second surface portion 42 approach each other in a state where the first preload portion 40 is arranged between the holder 20 and the first support portion 30. Therefore, the first preload portion 40 applies preload to the holder 20 by a reaction force based on the deformation amount.

The first preload portion 40 has a convex portion protruding toward at least one of the holder 20 and the first support portion 30, or a concave portion recessed on the side opposite to at least one of the holder 20 and the first support portion 30. The convex portion or the concave portion of the first preload portion 40 comes into contact with the concave portion or the convex portion of at least one of the holder 20 and the first support portion 30. In the present embodiment, the first preload portion 40 has the axial convex portion 45. The axial convex portion 45 may be arranged on one of the first surface portion 41 and the second surface portion 42, and may protrude toward one of the holder 20 and the first support portion 30. In the present embodiment, the axial convex portion 45 is arranged on the first surface portion 41 and protrudes toward the holder 20. The axial convex portion 45 of the first preload portion 40 comes into contact with the axial concave portion 22b of the holder 20. Thus, the first preload portion 40 has the axial convex portion 45 and the holder 20 has the axial concave portion 22b, so that it is possible to swing the holder 20 in a state where the first preload portion 40 is attached to the first support portion 30. That is, the first preload portion 40 does not swing about the first swing axis A1. Therefore, the holder 20 can be swung with a smaller driving force as compared with the case where both the first preload portion 40 and the holder 20 are swung.

In the present embodiment, the axial convex portion 45 is arranged on the first surface portion 41. The axial convex portion 45 protrudes toward the holder 20 on the first swing axis A1. The axial convex portion 45 has at least a part of a spherical surface. A part of the axial convex portion 45 is accommodated in the axial concave portion 22b. Therefore, since the axial convex portion 45 and the axial concave portion 22b are in point contact with each other, the first preload portion 40 can stably support the holder 20.

In the present embodiment, a pair of the first preload portions 40 are provided. That is, the optical unit 1 has the pair of first preload portions 40. The pair of first preload portions 40 are arranged on both sides of the first swing axis A1 in the axial direction with respect to the holder 20. Therefore, the holder 20 can be supported more stably as compared with the case where the first preload portion 40 is arranged only on one side of the holder 20.

Specifically, the axial convex portions 45 of the pair of first preload portions 40 come into contact with the pair of axial concave portions 22b of the holder 20, respectively. The holder 20 is supported by the first preload portion 40 from both sides in the axial direction of the first swinging axis A1 at two contact points in contact with the axial convex portion 45. Therefore, the holder 20 can swing about the first swing axis A1 passing through the two contact points.

The first preload portion 40 further has the protrusion portion 46. The protrusion portion 46 is arranged on one of the first surface portion 41 and the second surface portion 42, and protrudes toward one of the holder 20 and the first support portion 30. In the present embodiment, the protrusion portion 46 is arranged on the first surface portion 41 similarly to the axial convex portion 45. The protrusion portion 46 protrudes toward the holder 20 in a direction along the first swing axis A1. The protrusion portion 46 is provided corresponding to the restriction concave portion 22c. For example, four protrusion portions 46 are provided in each first preload portion 40. A part of the protrusion portion 46 is housed in the restriction concave portion 22c. The protrusion portion 46 is arranged so as to surround the axial convex portion 45. In other words, the axial convex portion 45 is arranged inside a region containing the four protrusion portions 46. The number of the protrusion portions 46 may be, for example, 1 to 3, or 5 or more. The protrusion portion 46 is formed by bending the end portion of the first surface portion 41.

The first preload portion 40 has an attachment portion 47. The attachment portion 47 is arranged, for example, on the second surface portion 42. The attachment portion 47 is arranged at the upper end of the second surface portion 42. The attachment portion 47 is attached on the upper end of the side surface portion 32 of the first support portion 30. The attachment portion 47 is attached on the side surface portion 32, for example, by putting the upper end of the side surface portion 32 in the first direction X. The first preload portion 40 needs not to have the attachment portion 47, and may be fixed to the first support portion 30 by using, for example, an adhesive or the like.

Figure 9:
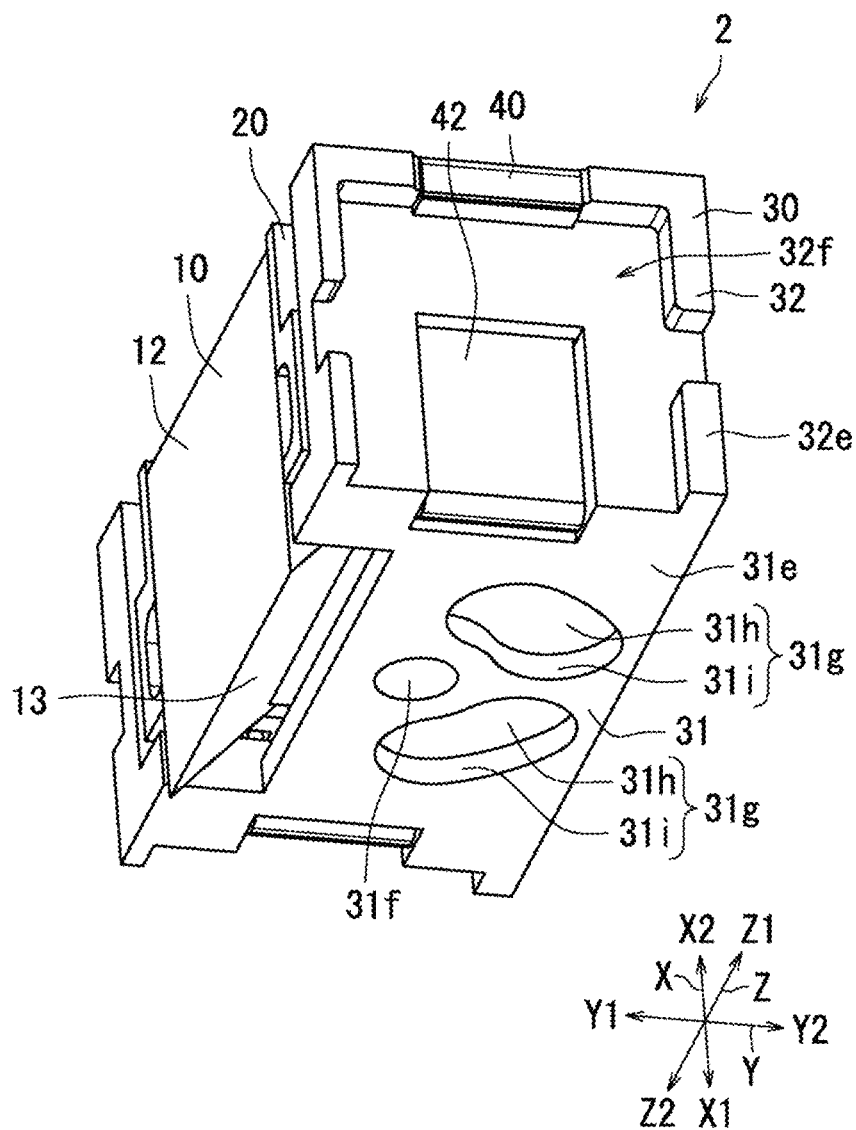
FIG. 9 is a perspective view showing the movable body of the optical unit according to the present embodiment.
Figure 10:
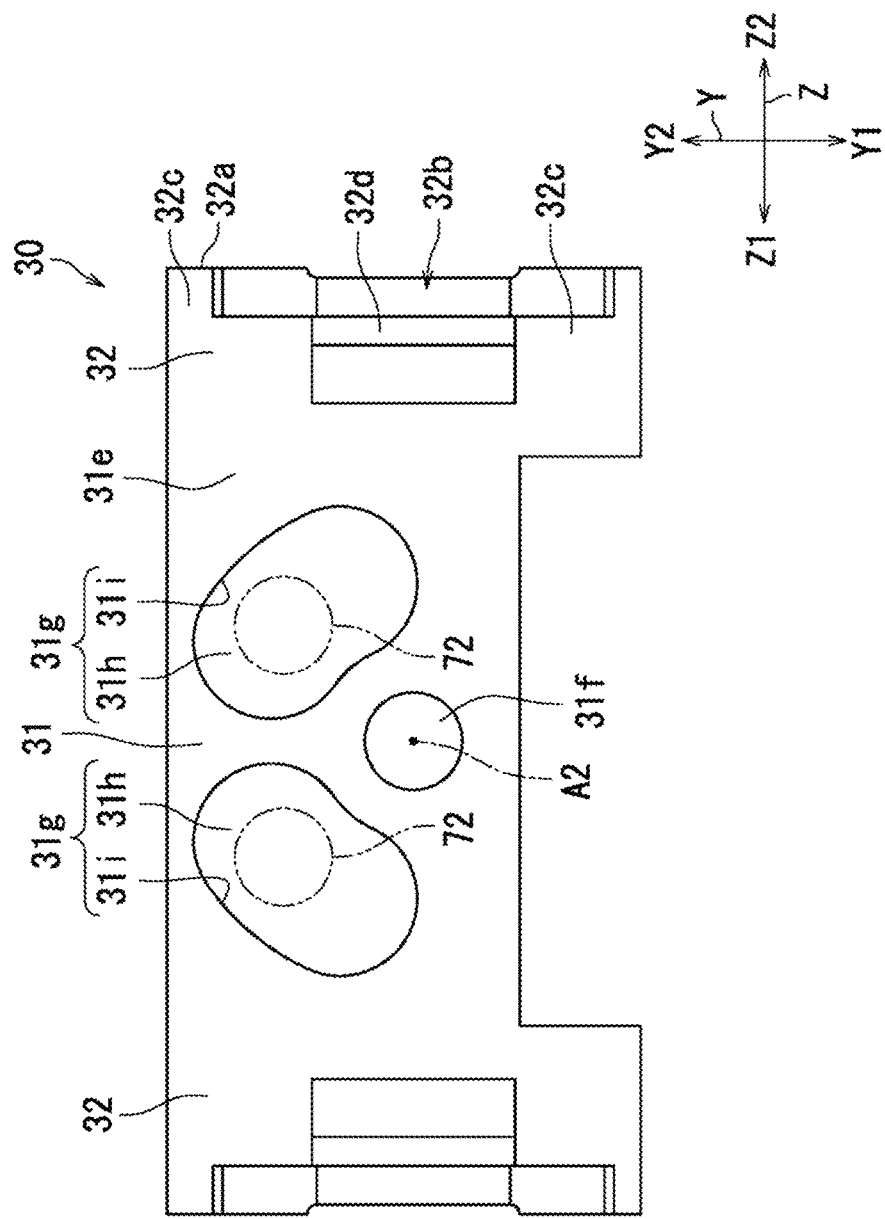
FIG. 10 is a view showing the first support portion of the optical unit according to the present embodiment viewed from one side X1 in a first direction X.
Figure 11:
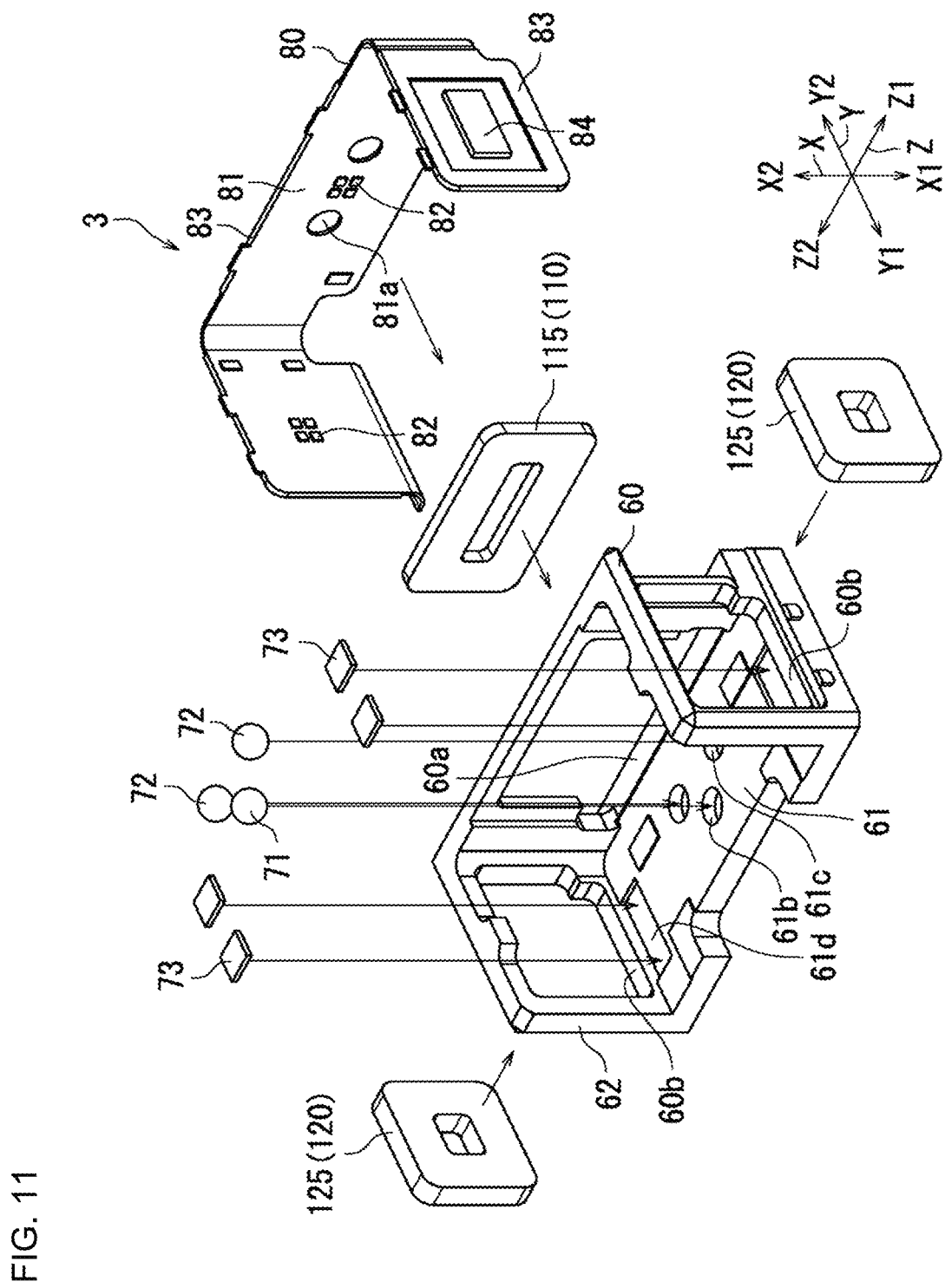
FIG. 11 is an exploded perspective view of the support body of the optical unit according to the present embodiment.
Figure 12:
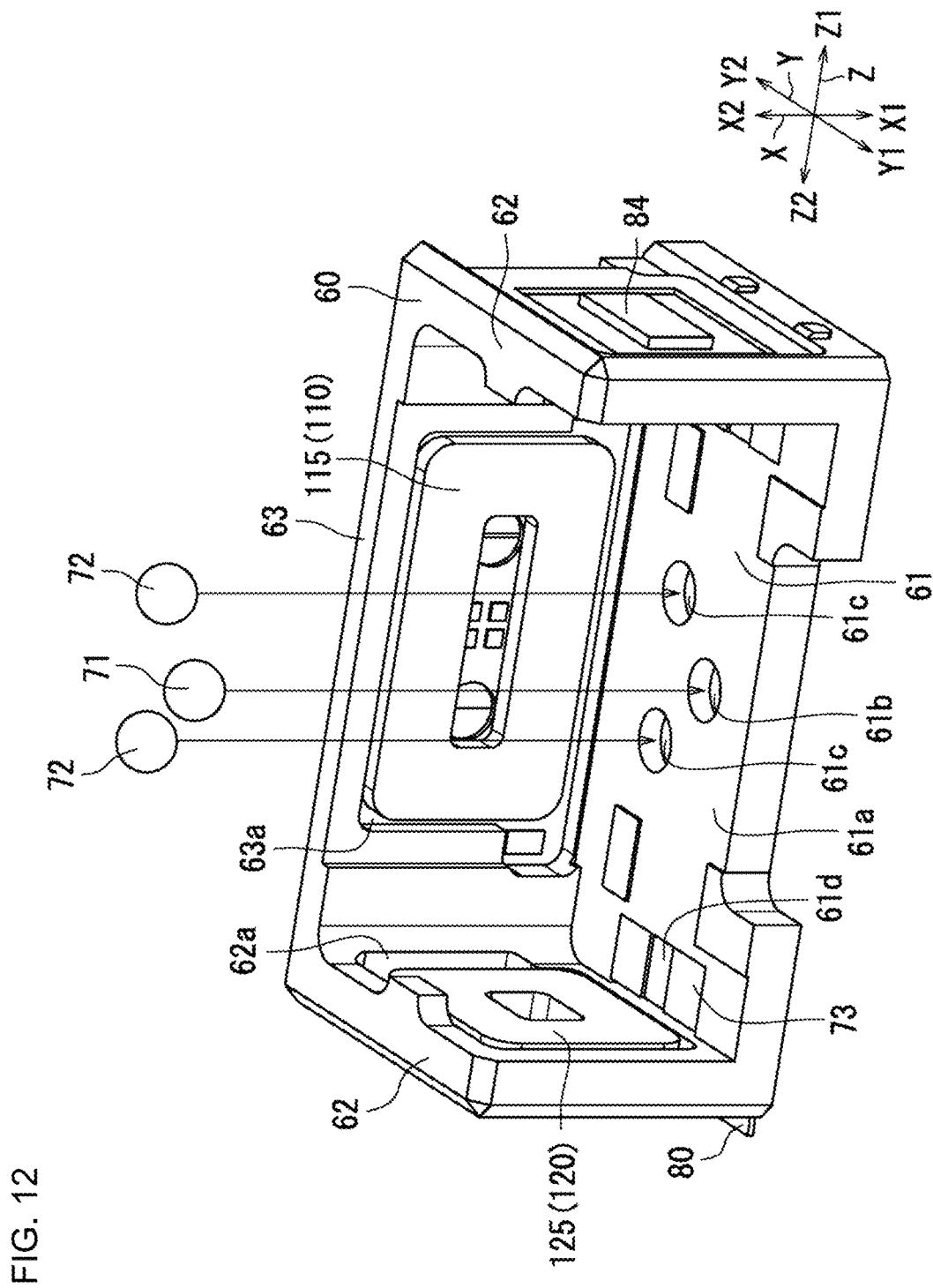
FIG. 12 is a perspective view showing a periphery of a second support portion of the optical unit according to the present embodiment.

FIG. 9 is a perspective view showing the movable body 2 of the optical unit 1 according to the present embodiment. FIG. 10 is a view showing the first support portion 30 of the optical unit 1 according to the present embodiment viewed from the one side X1 in the first direction X. FIG. 11 is an exploded perspective view of the support body 3 of the optical unit 1 according to the present embodiment. FIG. 12 is a perspective view showing the periphery of the second support portion 60 of the optical unit 1 according to the present embodiment.

As shown in FIGS. 9 to 12, one of the movable body 2 and the support body 3 has a first convex portion 71 protruding toward the other of the movable body 2 and the support body 3. Specifically, one of the first support portion 30 and the second support portion 60 has the first convex portion 71 protruding toward the other of the first support portion 30 and the second support portion 60. The other of the movable body 2 and the support body 3 comes into contact with the first convex portion 71. The first convex portion 71 is arranged on the second swing axis A2. Therefore, the movable body 2 swings about the first convex portion 71. Therefore, it is possible to reduce the length from the contact position between the movable body 2 and the support body 3 to the swing center. The force required to swing the movable body 2 is the product of the length from the contact position to the swing center and the frictional force. Therefore, by arranging the first convex portion 71 on the second swing axis A2, it is possible to reduce the force required to swing the movable body 2. That is, the force required to drive the optical unit 1 can be reduced. The material of the first convex portion 71 is not particularly limited, but the first convex portion 71 is formed of, for example, ceramic, resin, or metal.

Since the first convex portion 71 is arranged on the second swing axis A2, the contact position between the movable body 2 and the support body 3 does not move with respect to the first convex portion 71. Therefore, it is possible to reduce the frictional force between the other of the movable body 2 and the support body 3 and the convex portion 71, for example, as compared with the case where the other of the movable body 2 and the support body 3 slides with respect to the first convex portion 71 when the movable body 2 swings. Since the optical axis L10 and the second swing axis A2 are arranged to overlap each other, it is possible to suppress the optical axis L10 from deviating from the second swing axis A2 when the movable body 2 is swung.

In the present embodiment, the support body 3 has the first convex portion 71. Therefore, it is possible to suppress the first convex portion 71 from rotating when the movable body 2 swings. Therefore, the movable body 2 can be supported stably by the first convex portion 71. As a result, the swing of the movable body 2 is stabilized.

One of the movable body 2 and the support body 3 has a plurality of second convex portions 72 protruding toward the other of the movable body 2 and the support body 3. Specifically, one of the first support portion 30 and the second support portion 60 has the plurality of second convex portions 72 protruding toward the other of the first support portion 30 and the second support portion 60. The plurality of second convex portions 72 are arranged at positions separated from the second swing axis A2. The other of the movable body 2 and the support body 3 comes into contact with the plurality of second convex portions 72. The first convex portion 71 and the plurality of second convex portions 72 are arranged on the same plane intersecting the second swing axis A2. Therefore, the movable body 2 can be supported by the first convex portion 71 and the plurality of second convex portions 72 arranged on the same plane. As a result, the movable body 2 can be supported stably. Examples of the same plane on which the first convex portion 71 and the plurality of second convex portions 72 are arranged include a plane including an opposing surface 61a and a plane including a lower opposing surface 31e. The material of the second convex portions 72 is not particularly limited, but the second convex portions 72 are formed of, for example, ceramic, resin, or metal.

The position of the second convex portions 72 is constant. In other words, the second convex portions 72 do not move with respect to one of the movable body 2 and the support body 3. In the present embodiment, the second convex portions 72 do not move with respect to the support body 3. In other words, in the present embodiment, the position of the second convex portions 72 with respect to the support body 3 is constant even when the movable body 2 swings. Therefore, the movable body 2 can be supported more stably.

The number of the second convex portions 72 is two in the present embodiment. Therefore, the movable body 2 is supported by the three convex portions (first convex portion 71 and second convex portion 72), and thus, the movable body 2 can be supported more stably as compared with a case where the movable body 2 is supported by four or more convex portions. In the present embodiment, since the movable body 2 is in point contact at three points, the movable body 2 can be supported more stably.

The other of the movable body 2 and the support body 3 has a first concave portion 31f recessed in the direction opposite to the first convex portion 71. The first concave portion 31f comes into contact with the first convex portion 71. Therefore, by receiving the first convex portion 71 at the first concave portion 31f, it is possible to suppress the center of the first convex portion 71 from deviating from the center axis of the first concave portion 31f. As a result, image blur due to deviation of the center of rotation can be suppressed. It is possible to suppress the swing of the movable body 2 from becoming unstable due to the deviation of the center of rotation. As a result, for example, it is possible to suppress the current value required to swing from fluctuating.

In the present embodiment, the movable body 2 has the first concave portion 31f, and the support body 3 has the first convex portion 71. Therefore, when the first convex portion 71 is a sphere, the movable body 2 can be assembled to the support body 3 in a state where the sphere is arranged on the second support portion 60, and therefore the assembly work can be facilitated.

Next, the structure around the first support portion 30 will be described in detail with reference to FIGS. 8 and 9. As shown in FIGS. 8 and 9, the first support portion 30 has a support main body 31 and a pair of the side surface portions 32. The pair of side surface portions 32 are arranged on both sides of the holder 20 in the axial direction of the first swing axis A1. The support main body 31 connects the pair of side surface portions 32. Note that the support main body 31 is an example of the "connection portion" of the present disclosure.

The support main body 31 has an upper opposing surface 31a. The upper opposing surface 31a opposes the holder 20 in the first direction X. The upper opposing surface 31a is separated from the bottom surface of the holder 20.

The pair of side surface portions 32 are arranged at both ends of the support main body 31 in the third direction Z. The pair of side surface portions 32 have shapes symmetrical to each other in the third direction Z. The side surface portion 32 has an inner side surface 32a. The inner side surface 32a opposes the holder 20 in the third direction Z.

One of the first support portion 30 and the holder 20 has a groove 32b. The groove 32b is recessed on the first swing axis A1 on the side opposite to the other of the first support portion 30 and the holder 20. The groove 32b accommodates at least a part of the first preload portion 40 and extends in a direction intersecting the first swing axis A1. Therefore, by moving the first preload portion 40 along the groove 32b, it is possible to easily attach the holder 20 and the first preload portion 40 to the first support portion 30. In the present embodiment, the first support portion 30 has the groove 32b. The groove 32b is recessed on the first swing axis A1 on the side opposite to the holder 20.

In the present embodiment, the groove 32b is arranged on the inner side surface 32a. The groove 32b accommodates a part of the first preload portion 40. The groove 32b extends in the first direction X.

Each side surface portion 32 has a pair of support column portions 32c and a connection portion 32d. The pair of support column portions 32c are separated from each other in the second direction Y. The support column portion 32c extends in the first direction X. The connection portion 32d connects upper portions of the support column portions 32c to each other. The length of the connection portion 32d in the third direction Z is shorter than the length of the support column portion 32c in the third direction Z. The groove 32b is formed by the pair of support column portions 32c and the connection portion 32d.

The first preload portion 40 can move along the groove 32b. In the present embodiment, the first preload portion 40 can move in the first direction X along the groove 32b. By moving the first preload portion 40 along the groove 32b, the attachment portion 47 of the first preload portion 40 holds the connection portion 32d in the third direction Z. Therefore, the first preload portion 40 is fixed to the first support portion 30.

The side surface portion 32 has an outer side surface 32e and an accommodation concave portion 32f. The outer side surface 32e faces outside in the third direction Z. The accommodation concave portion 32f is arranged on the outer side surface 32e. The accommodation concave portion 32f accommodates at least a part of the second magnet 121 of the second swing mechanism 120. The side surface portion 32 has a pair of notch portions 32g. The notch portion 32g is arranged at the end portion of the accommodation concave portion 32f in the second direction Y. A projection 122a of a magnet support plate 122 is arranged in the notch portion 32g. The magnet support plate 122 supports the second magnet 121. The notch portion 32g supports the magnet support plate 122. The material of the magnet support plate 122 is not particularly limited, but for example, a magnetic material may be used. In this case, the magnet support plate 122 is also called a back yoke. Use of the magnet support plate 122 made of a magnetic material can suppress magnetic leakage.

The other of the movable body 2 and the support body 3 has a second concave portion 31g. In the present embodiment, the movable body 2 has the second concave portion 31g. Specifically, the support main body 31 has the lower opposing surface 31e, the first concave portion 31f, and the second concave portion 31g. The lower opposing surface 31e opposes the support body 3 in the first direction X. The first concave portion 31f and the second concave portion 31g are arranged on the lower opposing surface 31e.

The first concave portion 31f is arranged on the second swing axis A2. The first concave portion 31f has a part of a concave spherical surface. Therefore, since the first convex portion 71 is received by the concave spherical surface, for example, the first convex portion 71 becomes less likely to laterally deviate in the first concave portion 31f. As a result, the movable body 2 can be supported stably. On the other hand, for example, when the first concave portion 31f has a rectangular cross section, the first convex portion 71 tends to laterally deviate with respect to the first concave portion 31f. In the present embodiment, for example, unlike the case where the first convex portion 71 and the first concave portion 31f have a rectangular cross section, the first convex portion 71 and the first concave portion 31f can be easily brought into point contact.

The second concave portion 31g is recessed in the direction opposite to the second convex portion 72. The second concave portion 31g is separated from the first concave portion 31f. That is, the second concave portion 31g is separated from the second swing axis A2. A plurality of the second concave portions 31g are provided. In the present embodiment, two second concave portions 31g are provided. The two second concave portions 31g are arranged at equal distances to the second swing axis A2. The second concave portion 31g has a sliding surface 31h and an inner side surface 31i.

The second concave portion 31g comes into contact with the second convex portion 72. Specifically, the sliding surface 31h of the second concave portion 31g comes into contact with the second convex portion 72. The sliding surface 31h is arranged substantially parallel to the lower opposing surface 31e. That is, the depth of the second concave portion 31g is substantially constant.

As shown in FIG. 10, the contour of the second concave portion 31g is arranged outside the second convex portion 72 as viewed from the optical axis direction. Therefore, it is possible to suppress the second convex portion 72 from coming into contact with the inner side surface 31i of the second concave portion 31g. As a result, friction between the second convex portion 72 and the second concave portion 31g can be suppressed. Specifically, the inner side surface 31i surrounds the sliding surface 31h. The inner side surface 31i is separated from the second convex portion 72. That is, as viewed from the optical axis direction, the contour of the second concave portion 31g is separated with respect to the second convex portion 72. The inner side surface 31i is arranged at a position where the second convex portion 72 does not come into contact when the first support portion 30 is swung by the second swing mechanism 120 about the second swing axis A2. In the present embodiment, two second concave portions 31g are provided, but only one second concave portion 31g may be provided. That is, for example, one second concave portion larger than the second concave portion 31g may be provided, and two second convex portions 72 may be accommodated in the one second concave portion. In other words, the contour of the one second concave portion may be located outside the two second convex portions 72. However, the thickness of the first support portion 30 in a region where the second concave portion is formed becomes thin. Therefore, when one large second concave portion is provided, the strength of the first support portion 30 possibly decreases. Therefore, in the present embodiment, in order to secure the thickness of the first support portion 30 in a region other than the movable region of the second convex portion 72, the two second concave portions 31g are provided. In other words, the second concave portion is formed as two divided parts. Therefore, it is possible to suppress the thickness of the first support portion 30 from becoming thin between the two second concave portions 31g. As a result, it is possible to suppress the strength of the first support portion 30 from decreasing.

As shown in FIGS. 3 and 5A, the second convex portion 72 is arranged on the other side Y2 in the second direction Y relative to the first concave portion 31f. Therefore, it is possible to suppress the second convex portion 72 from coming into contact with the reflection surface 13 of the optical element 10. As a result, it is possible to easily secure a space for arranging the optical element 10. It is also possible to mount a larger optical element 10. Specifically, a part of the reflection surface 13 protrudes on the one side X1 in the first direction X and the one side Y1 in the second direction Y with respect to the lower opposing surface 31e. Therefore, it is possible to suppress the optical element 10 from coming into contact with a part of the first support portion 30 where the second convex portion 72 is arranged. As a result, it is possible to secure a space for arranging the optical element 10.

As shown in FIGS. 11 and 12, the support body 3 has the second support portion 60, the first convex portion 71, the second convex portion 72, and a magnetic member 73. The support body 3 preferably has the opposing surface 61a and a third accommodation concave portion 61d.

Specifically, the second support portion 60 supports the first support portion 30 swingably about the second swing axis A2 intersecting the first swing axis A1. The second support portion 60 supports the first support portion 30 in the first direction X.

Figure 13:
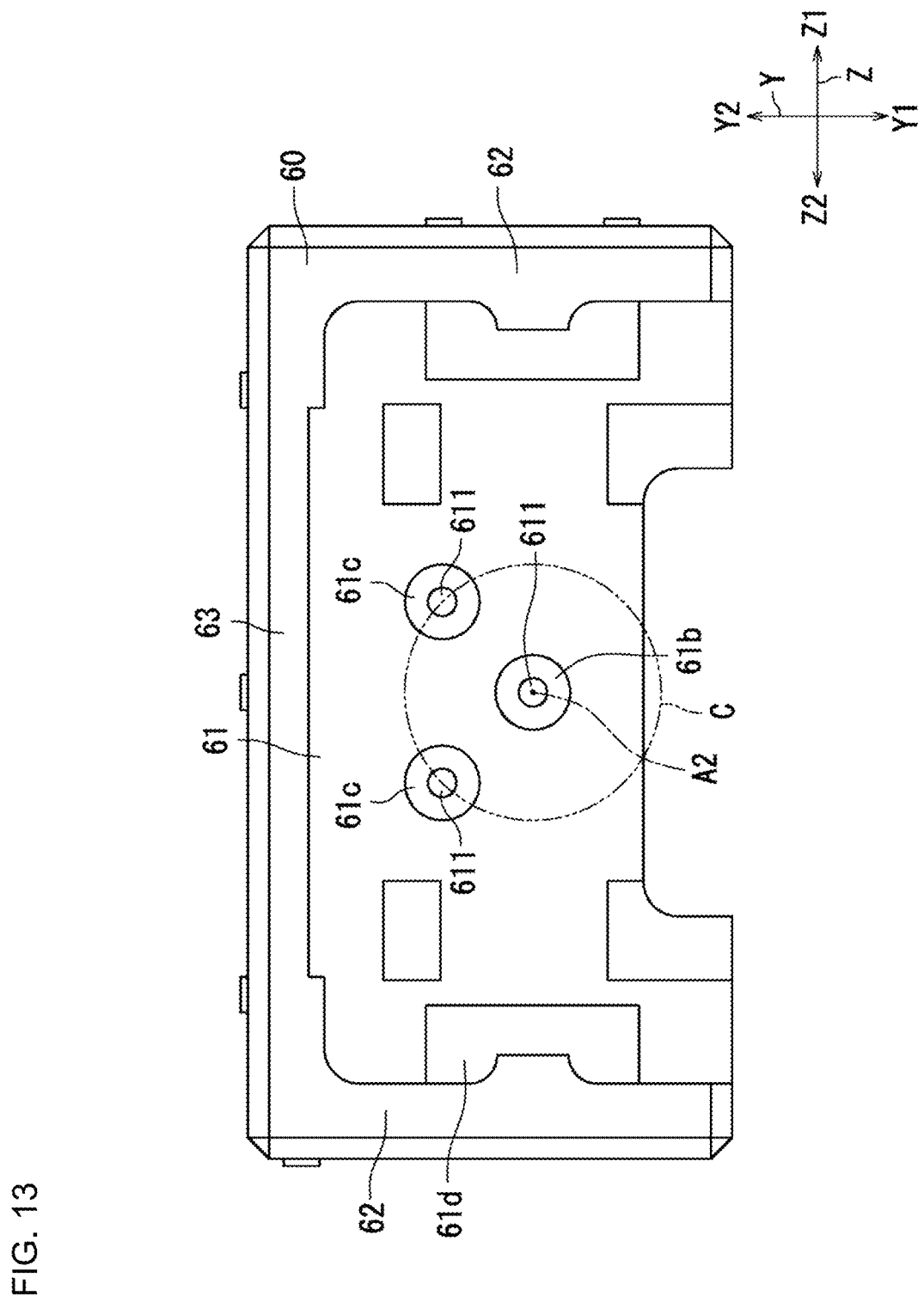
FIG. 13 is a view showing the second support portion of the optical unit according to the present embodiment viewed from the other side X2 in the first direction X.

FIG. 13 is a view showing the second support portion of the optical unit according to the present embodiment viewed from the other side X2 in the first direction X. As shown in FIGS. 11 and 13, the second support portion 60 includes a support main body 61, a pair of side surface portions 62, and a back surface portion 63. The support main body 61 has the opposing surface 61a, a first accommodation concave portion 61b, at least two second accommodation concave portions 61c, and a plurality of the third accommodation concave portions 61d. In the present embodiment, the support main body 61 has one first accommodation concave portion 61b, two second accommodation concave portions 61c, and two third accommodation concave portions 61d. Note that in the present embodiment, an example in which the second support portion 60 has the first accommodation concave portion 61b and the second accommodation concave portion 61c will be described. However, one of the movable body 2 and the support body 3 may have the first accommodation concave portion and the second accommodation concave portion that are recessed in the direction opposite to the other of the movable body 2 and the support body 3. For example, one of the movable body 2 and the support body 3 may have the first accommodation concave portion, and the other of the movable body 2 and the support body 3 may have the second accommodation concave portion.

The opposing surface 61a opposes the lower opposing surface 31e of the first support portion 30 in the first direction X. The first accommodation concave portion 61b, the second accommodation concave portion 61c, and the third accommodation concave portion 61d are arranged on the opposing surface 61a. The first accommodation concave portion 61b, the second accommodation concave portion 61c, and the third accommodation concave portion 61d are recessed in the direction opposite to the movable body 2 in the first direction X. That is, the first accommodation concave portion 61b, the second accommodation concave portion 61c, and the third accommodation concave portion 61d are recessed on the one side X1 in the first direction X. The first accommodation concave portion 61b opposes the first concave portion 31f of the first support portion 30 in the first direction X. The first accommodation concave portion 61b is arranged on a same circumference C (see FIG. 13) about the second swing axis A2. The first accommodation concave portion 61b accommodates a part of the first convex portion 71. Therefore, the first convex portion 71 is arranged on the second swing axis A2.

The second accommodation concave portion 61c is separated from the first accommodation concave portion 61b. Therefore, the second accommodation concave portion 61c is separated from the second swing axis A2. In the present embodiment, the second accommodation concave portion 61c is separated at a distance from the first accommodation concave portion 61b. The second accommodation concave portion 61c accommodates a part of the second convex portion 72. Therefore, the plurality of second convex portions 72 are arranged on the same circumference C about the second swing axis A2. Therefore, the movable body 2 can be supported at a position with an equal distance from the first convex portion 71. As a result, the movable body 2 can be supported more stably. Note that the axial direction of the second swing axis A2 is a direction along the first direction X.

The two second accommodation concave portions 61c are arranged at positions farther to the optical element 10 relative to the first accommodation concave portion 61b in a state of being arranged side by side in the third direction Z.

The first accommodation concave portion 61b holds a part of the first convex portion 71. In the present embodiment, the lower half of the first convex portion 71 is arranged in the first accommodation concave portion 61b. The first convex portion 71 has at least a part of a spherical surface. Therefore, since the first convex portion 71 comes into point contact with the other of the movable body 2 and the support body 3, the frictional force between the first convex portion 71 and the other of the movable body 2 and the support body 3 can be made smaller. In the present embodiment, since the first convex portion 71 comes into point contact with the movable body 2, the frictional force between the first convex portion 71 and the movable body 2 can be made smaller.

The first convex portion 71 is a sphere in the present embodiment. Therefore, the friction between the first convex portion 71 and the first concave portion 31f becomes rolling friction. As a result, it is possible to suppress an increase in the frictional force between the first convex portion 71 and the first concave portion 31f. Specifically, the first convex portion 71 can rotate in the first accommodation concave portion 61b. Therefore, the friction between the first convex portion 71 and the first concave portion 31f becomes rolling friction. The first convex portion 71 may be fixed to the first concave portion 31f by using, for example, an adhesive.

The second accommodation concave portion 61c holds a part of the second convex portion 72. In the present embodiment, the lower half of the second convex portion 72 is arranged in the second accommodation concave portion 61c. The second convex portion 72 has at least a part of a spherical surface. Therefore, since the second convex portion 72 comes into point contact with the other of the movable body 2 and the support body 3, the frictional force between the second convex portion 72 and the other of the movable body 2 and the support body 3 can be made smaller. In the present embodiment, since the second convex portion 72 is in point contact with the movable body 2, the frictional force between the second convex portion 72 and the movable body 2 can be reduced.

The second convex portion 72 is a sphere in the present embodiment. Therefore, since the friction between the second convex portion 72 and the other of the movable body 2 and the support body 3 becomes rolling friction, the frictional force can be suppressed. In the present embodiment, the friction between the second convex portion 72 and the movable body 2 becomes rolling friction. Specifically, the second convex portion 72 can rotate in the second accommodation concave portion 61c. Therefore, the friction between the second convex portion 72 and the second concave portion 31g of the first support portion 30 becomes rolling friction. The second convex portion 72 may be fixed to the second concave portion 31g by using, for example, an adhesive.

As shown in FIGS. 5C and 13, the first accommodation concave portion 61b may have a center concave portion 611. The center concave portion 611 is arranged concentrically with the first accommodation concave portion 61b. The first convex portion 71 comes into contact with the edge of the center concave portion 611. The diameter of the center concave portion 611 is smaller than the diameter of the first convex portion 71. Therefore, for example, even when there is a gap between the outer peripheral surface of the first convex portion 71 and the inner peripheral surface of the first accommodation concave portion 61b, the first convex portion 71 can be positioned by the center concave portion 611. That is, the center of the first convex portion 71 can be arranged on the center axis of the center concave portion 611. As a result, the center of the first convex portion 71 can be easily arranged on the center axis of the first accommodation concave portion 61b.

As shown in FIGS. 5D and 13, the second accommodation concave portion 61c may have the center concave portion 611. The center concave portion 611 is arranged concentrically with the second accommodation concave portion 61c. The second convex portion 72 comes into contact with the edge of the center concave portion 611. The diameter of the center concave portion 611 is smaller than the diameter of the second convex portion 72. Therefore, for example, even when there is a gap between the outer peripheral surface of the second convex portion 72 and the inner peripheral surface of the second accommodation concave portion 61c, the second convex portion 72 can be positioned by the center concave portion 611. That is, the center of the second convex portion 72 can be arranged on the center axis of the center concave portion 611. As a result, the center of the second convex portion 72 can be easily arranged on the center axis of the second accommodation concave portion 61c.

The material of the first convex portion 71 and the second convex portion 72 is ceramic. Therefore, it is possible to suppress the first convex portion 71 and the second convex portion 72 from becoming worn. The material of the first convex portion 71 and the second convex portion 72 may be metal. Also in this case, it is possible to suppress the first convex portion 71 and the second convex portion 72 from becoming worn. The entire first convex portion 71 and the entire second convex portion 72 may be formed of metal, or only the surface of the first convex portion 71 and the second convex portion 72 may be formed of metal by plating, for example. The first convex portion 71 and the second convex portion 72 may be formed of a resin.

The first convex portion 71 is arranged on the one side X1 in the first direction X with respect to the reflection surface 13 (see FIG. 5A) of the optical element 10. Therefore, it is possible to arrange the first convex portion 71 without blocking the light path.

The optical unit 1 has a second preload portion 150 (see FIG. 5D) arranged on at least one of the movable body 2 and the support body 3. The second preload portion 150 applies preload to at least the other of the movable body 2 and the support body 3 in the axial direction of the second swing axis A2. Therefore, it is possible to suppress the movable body 2 from displacing in the axial direction of the second swing axis A2 with respect to the support body 3. Even when a manufacturing error occurs in dimensions of each member, it is possible to suppress rattling or the like from occurring in the axial direction of the second swing axis A2. In other words, it is possible to suppress the position of the movable body 2 from displacing in the axial direction of the second swing axis A2.

The second preload portion 150 has a magnet arranged on one of the movable body 2 and the support body 3 and a magnetic member arranged on the other of the movable body 2 and the support body 3. Therefore, since a force attracting each other acts on the magnet and the magnetic member, preload can be applied to at least the other of the movable body 2 and the support body 3 in the axial direction of the second swing axis A2 with a simple configuration. In the present embodiment, the second preload portion 150 has the second magnet 121 arranged on the movable body 2 and the magnetic member 73 arranged on the support body 3.

Figure 14:
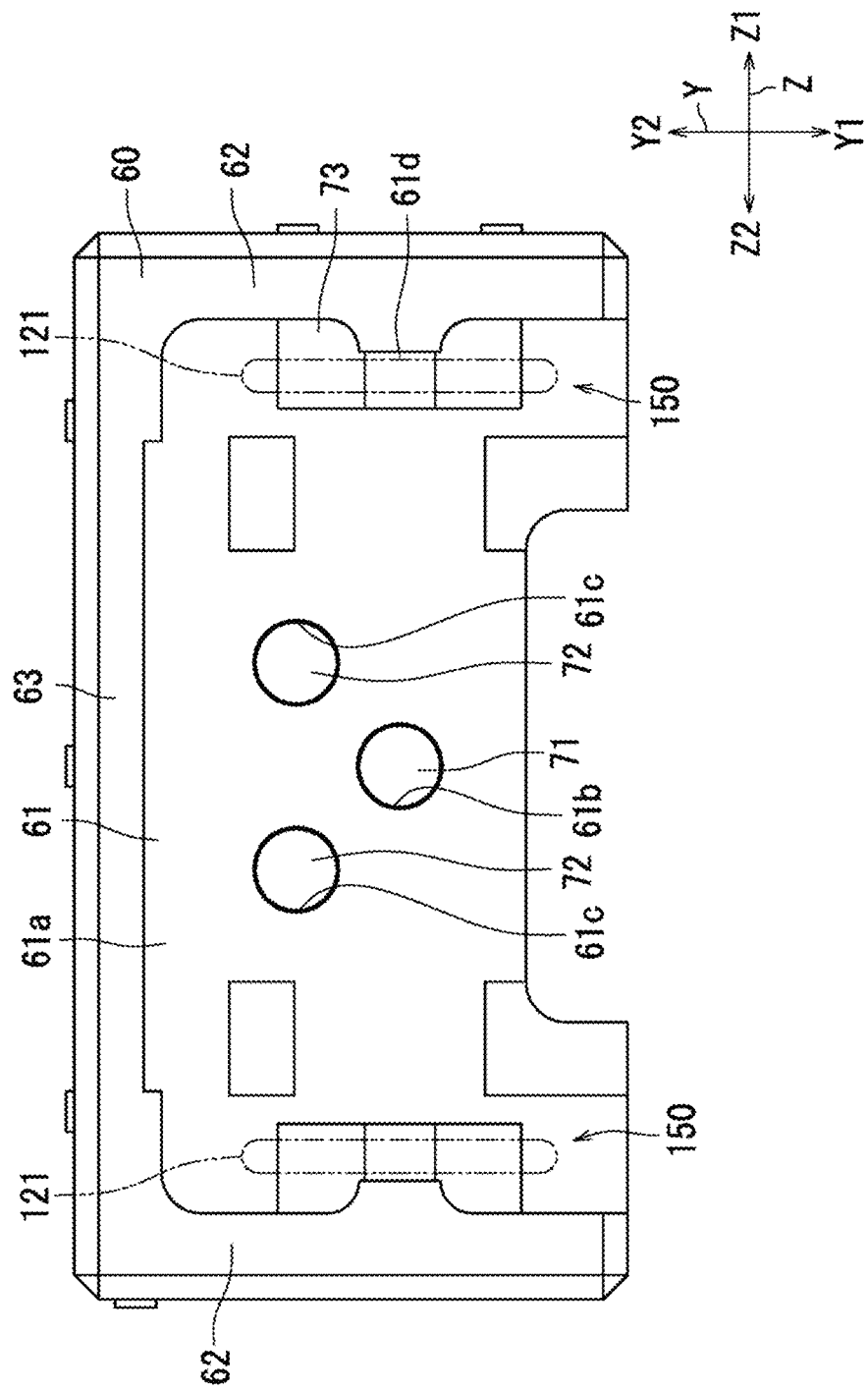
FIG. 14 is a view showing the second support portion, a first convex portion, a second convex portion, and the second magnet of the optical unit according to the present embodiment viewed from the other side X2 in the first direction X.

FIG. 14 is a view showing the second support portion 60, the first convex portion 71, the second convex portion 72, and the second magnet 121 of the optical unit 1 according to the present embodiment viewed from the other side X2 in the first direction X. As shown in FIGS. 5D and 14, the third accommodation concave portion 61d opposes the second magnet 121 of the second swing mechanism 120 in the first direction X. The third accommodation concave portion 61d accommodates the magnetic member 73. The third accommodation concave portion 61d has a substantially rectangular shape. The magnetic member 73 has a rectangular shape.

The magnetic member 73 is a plate-like member made of a magnetic material. The magnetic member 73 is arranged on the one side X1 in the first direction X with respect to the second magnet 121. Since a force attracting each other (hereinafter, also referred to as an attraction force) acts on the second magnet 121 and the magnetic member 73, the movable body 2 can be suppressed from displacing in the first direction X with respect to the support body 3. Since the second magnet 121 of the second swing mechanism 120 is used, the number of components can be suppressed from increasing. The optical unit 1 may have a magnet for applying an attraction force with the magnetic member 73, separately from the second magnet 121 of the second swing mechanism 120.

In the present embodiment, two magnetic members 73 are arranged in each third accommodation concave portions 61d. In other words, the magnetic member 73 is arranged separately in a polarized direction of the second magnet 121 of the second swing mechanism 120. Therefore, an area of the second magnet 121 becomes smaller than that in a case where the second magnet 121 is not separated. Note that the second magnet 121 is polarized in the second direction Y as shown in FIG. 8. Here, when the second swing mechanism 120 swings the movable body 2, a force is applied to the movable body 2 in a direction of returning to a reference position due to the attraction force between the second magnet 121 and the magnetic member 73. As shown in FIG. 5B, the reference position is a position where the side surface portion 32 of the first support portion 30 and the side surface portion 62 of the second support portion 60 become parallel to each other.

As shown in FIGS. 12 and 14, the pair of side surface portions 62 are arranged at both ends of the support main body 61 in the third direction Z. The pair of side surface portions 62 have shapes symmetrical to each other in the third direction Z. The side surface portion 62 has an accommodation hole 62a in which a second coil 125 of the second swing mechanism 120 is arranged. The accommodation hole 62a penetrates the side surface portion 62 in the thickness direction. That is, the accommodation hole 62a penetrates the side surface portion 62 in the third direction Z.

The back surface portion 63 is arranged at the end portion of the support main body 61 on the other side Y2 in the second direction Y. The back surface portion 63 has an accommodation hole 63a in which a first coil 115 of the first swing mechanism 110 is arranged. The accommodation hole 63a penetrates the back surface portion 63 in the thickness direction. That is, the accommodation hole 63a penetrates the back surface portion 63 in the second direction Y.

A flexible printed circuit (FPC) 80 is arranged so as to cover the outside of the pair of side surface portions 62 and the outside of the back surface portion 63. The FPC 80 includes, for example, a semiconductor element, a connection terminal, and a wiring. The FPC 80 supplies electric power to the first coil 115 of the first swing mechanism 110 and the second coil 125 of the second swing mechanism 120 at a predetermined timing.

Specifically, as shown in FIG. 11, the FPC 80 includes a substrate 81, a connection terminal 82, a reinforcing plate 83, and a magnetic member 84. The substrate 81 includes, for example, a polyimide substrate. The substrate 81 has flexibility. The substrate 81 has a plurality of pin insertion holes 81a. The pin insertion holes 81a oppose the first coil 115. A coil pin (not illustrated) of the first coil 115 is arranged in each pin insertion hole 81a.

The connection terminal 82 is arranged on the substrate 81. The connection terminal 82 opposes the first swing mechanism 110 and the second swing mechanism 120. The connection terminal 82 is electrically connected to a terminal of a Hall element (not illustrated). For example, four connection terminals 82 are arranged for one Hall element. Three reinforcing plates 83 are arranged on the substrate 81. The reinforcing plates 83 oppose the first swing mechanism 110 and the second swing mechanism 120. The reinforcing plate 83 suppresses the substrate 81 from bending.

Three magnetic members 84 are arranged on the substrate 81. Two of the magnetic members 84 oppose the second magnet 121 of the second swing mechanism 120. In a state where the second coil 125 is not energized, an attraction force occurs between the second magnet 121 and the magnetic member 84. Thus, the movable body 2 is arranged at the reference position in a rotation direction about the second swing axis A2. The remaining one of the magnetic members 84 opposes the first magnet 111 of the first swing mechanism 110. In a state where the first coil 115 is not energized, an attraction force occurs between the first magnet 111 and the magnetic member 84. Thus, the movable body 2 is arranged at the reference position in a rotation direction about the first swing axis A1. The occurrence of the attraction force between the first magnet 111 and the magnetic member 84 makes it possible to suppress the holder 20 from coming off to the one side Y1 of the second direction Y.

As shown in FIGS. 5A and 5B, the optical unit 1 further includes the first swing mechanism 110. The first swing mechanism 110 swings the holder 20 with respect to the first support portion 30 about the first swing axis A1. Therefore, the optical element 10 can be easily swung about the first swing axis A1. The first swing mechanism 110 includes the first magnet 111 and the first coil 115. The first coil 115 opposes the first magnet 111 in the second direction Y.

The first magnet 111 is arranged on one of the holder 20 and the second support portion 60. On the other hand, the first coil 115 is arranged on the other of the holder 20 and the second support portion 60. Therefore, a force acts on the first magnet 111 due to a magnetic field occurring when a current flows through the first coil 115. The holder 20 swings with respect to the first support portion 30. Thus, the holder 20 can be swung with a simple configuration using the first magnet 111 and the first coil 115. In the present embodiment, the first magnet 111 is arranged on the holder 20. The first coil 115 is arranged on the second support portion 60. Since the first coil 115 is arranged on the second support portion 60, the first coil 115 does not swing with respect to the second support portion 60. Therefore, wiring can be easily performed on the first coil 115 as compared with a case where the first coil 115 is arranged, for example, on the first support portion 30.

Specifically, the first magnet 111 is arranged on the back surface 21b of the holder 20. That is, the first magnet 111 is arranged at an end portion 20a of the holder 20 on the other side Y2 in the second direction Y. The first magnet 111 has an n pole portion 111a including an n pole and an s pole portion 111b including an s pole. The first magnet 111 is polarized in the first direction X.

The first coil 115 is arranged in the accommodation hole 63a of the back surface portion 63 of the second support portion 60. That is, the first coil 115 is arranged at an end portion 60a of the second support portion 60 on the other side Y2 in the second direction Y. Therefore, it is possible to suppress the first coil 115 and the first magnet 111 from being arranged on the light path. Thus, it is possible to suppress the light path from being blocked by the first coil 115 and the first magnet 111.

When the first coil 115 is energized, a magnetic field occurs around the first coil 115. Then, a force caused by the magnetic field acts on the first magnet 111. As a result, the holder 20 and the optical element 10 swing about the first swing axis A1 with respect to the first support portion 30 and the second support portion 60.

The second swing mechanism 120 swings the movable body 2 about the second swing axis A2. Specifically, the second swing mechanism 120 swings the first support portion 30 about the second swing axis A2 with respect to the second support portion 60. Therefore, the optical element 10 can be easily swung about the second swing axis A2. In the present embodiment, the optical element 10 can be easily swung about the first swing axis A1 and the second swing axis A2 by the first swing mechanism 110 and the second swing mechanism 120, respectively.

The second swing mechanism 120 includes the second magnet 121 and the second coil 125. The second coil 125 opposes the second magnet 121. The second magnet 121 is arranged on one of the first support portion 30 and the second support portion 60. On the other hand, the second coil 125 is arranged on the other of the first support portion 30 and the second support portion 60. Therefore, the first support portion 30 swings with respect to the second support portion 60 by the magnetic field occurring when a current flows through the second coil 125. Thus, the first support portion 30 can be swung with a simple configuration using the second magnet 121 and the second coil 125. In the present embodiment, the second magnet 121 is arranged on the first support portion 30. The second coil 125 is arranged on the second support portion 60. Since the second coil 125 is arranged on the second support portion 60, the second coil 125 does not swing with respect to the second support portion 60. Therefore, wiring can be easily performed on the second coil 125 as compared with a case where the second coil 125 is arranged, for example, on the first support portion 30.

Specifically, the second magnet 121 is arranged in the accommodation concave portion 32f (see FIG. 8) of the side surface portion 32 of the first support portion 30. That is, the second magnet 121 is arranged at an end portion 30a of the first support portion 30 in a direction intersecting the first direction X. In the present embodiment, the second magnet 121 is arranged at the end portion 30a of the third direction Z intersecting the first direction X and the second direction Y. The second magnet 121 has an n pole portion 121a including an n pole and an s pole portion 121b including an s pole. The second magnet 121 is polarized in the second direction Y intersecting the first direction X. Therefore, the movable body 2 can be swung about the second swing axis A2 along the incident direction of light.

The second coil 125 opposes the second magnet 121 in the third direction Z. The second coil 125 is arranged in the accommodation hole 62a (see FIG. 12) of the side surface portion 62 of the second support portion 60. That is, the second coil 125 is arranged at an end portion 60b of the second support portion 60 in the third direction Z. Therefore, it is possible to suppress the second coil 125 and the second magnet 121 from being arranged on the light path. Thus, it is possible to suppress the light path from being blocked by the second coil 125 and the second magnet 121.

When the second coil 125 is energized, a magnetic field occurs around the second coil 125. Then, a force caused by the magnetic field acts on the second magnet 121. As a result, the first support portion 30, the holder 20, and the optical element 10 swing about the second swing axis A2 with respect to the second support portion 60.

When the optical unit 1 is used for the smartphone 200 as shown in FIG. 1, a Hall element (not illustrated) in the smartphone 200 detects the attitude of the smartphone 200. Then, the first swing mechanism 110 and the second swing mechanism 120 are controlled in response to the attitude of the smartphone 200. Preferably, the optical unit 1 can detect the attitude of the holder 20 with respect to the second support portion 60. In this case, it is possible to control the attitude of the holder 20 with respect to the second support portion 60 with high accuracy. For example, a gyro sensor may be used as a sensor that detects the attitude of the smartphone 200.

Figure 15:
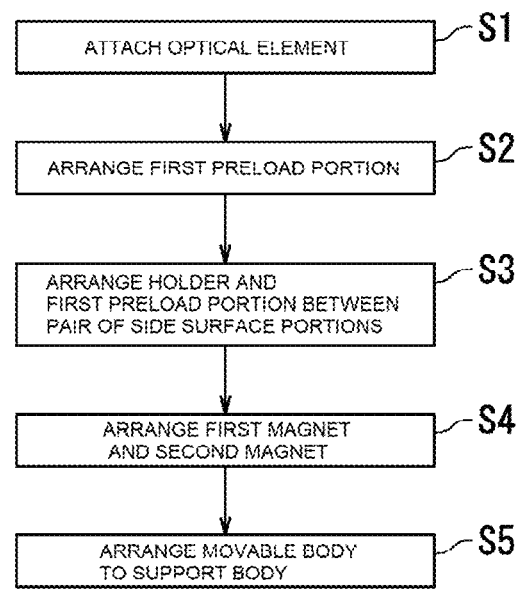
FIG. 15 is a flowchart showing a manufacturing process of the optical unit of the present embodiment.

Next, the manufacturing method of the optical unit 1 of the present embodiment will be described with reference to FIG. 15. FIG. 15 is a flowchart showing the manufacturing process of the optical unit 1 of the present embodiment. The manufacturing method of the optical unit 1 includes steps S1 to S5.

As shown in FIG. 15, in step S1, the optical element 10 is attached to the holder 20 (see FIG. 6). At this time, the optical element 10 is fixed to the holder 20 with, for example, an adhesive.

Next, in step S2, the first preload portion 40 is arranged at the end portion of the holder 20 in the axial direction of the first swing axis A1 (see FIG. 7). In the present embodiment, the first preload portions 40 are arranged on both sides of the holder 20 in the axial direction of the first swing axis A1.

Specifically, the axial convex portion 45 of the first preload portion 40 is brought into contact with the axial concave portion 22*b* of the holder 20. At this time, the protrusion portion 46 of the first preload portion 40 is arranged in the restriction concave portion 22*c* of the holder 20.

Next, in step S3, the holder 20 and the first preload portion 40 are arranged between the pair of side surface portions 32 of the first support portion 30 (see FIG. 8). In the present embodiment, the holder 20 and the pair of first preload portions 40 are arranged between the pair of side surface portions 32. At this time, the first preload portion 40 is moved along the groove 32*b* in a state of being compressed and deformed in the axial direction of the first swing axis A1.

In step S3, the first preload portion 40 is arranged between the holder 20 and the side surface portion 32.

In step S3, the convex portion or the concave portion included in the first preload portion 40 comes into contact with the concave portion or the convex portion included in at least one of the holder 20 and the first support portion 30. For example, when the first preload portion 40 has a convex portion, the convex portion of the first preload portion 40 protrudes toward at least one of the holder 20 and the first support portion 30. In this case, the concave portion of at least one of the holder 20 and the first support portion 30 is recessed on the side opposite to the first preload portion 40. For example, when the first preload portion 40 has a concave portion, the concave portion of the first preload portion 40 is recessed on the side opposite to at least one of the holder 20 and the first support portion 30. In this case, the convex portion of at least one of the holder 20 and the first support portion 30 protrudes toward the first preload portion 40.

In the present embodiment, the first preload portion 40 has the axial convex portion 45. The holder 20 has the axial concave portion 22*b*. The axial convex portion 45 of the first preload portion 40 comes into contact with the axial concave portion 22*b* of the holder 20.

In the present embodiment, the axial convex portion 45 and the axial concave portion 22*b* are brought into contact with each other in step S2, and the contact state between the axial convex portion 45 and the axial concave portion 22*b* is maintained in step S3. On the other hand, for example, when the first support portion 30 has a concave portion or a convex portion, the convex portion or the concave portion of the first preload portion 40 and the concave portion or the convex portion of the first support portion 30 do not come into contact with each other in step S2 and comes into contact with each other in step S3. In any case, in step S3, the convex portion or the concave portion included in the first preload portion 40 comes into contact with the concave portion or the convex portion included in at least one of the holder 20 and the first support portion 30.

Next, in step S4, the first magnet 111 is arranged in the holder 20. The second magnet 121 is arranged in the first support portion 30 (see FIG. 8).

Next, in step S5, the movable body 2 is arranged on the support body 3 (see FIG. 3).

As described above, the optical unit 1 is assembled.

In the manufacturing method of the optical unit 1 of the present embodiment, after the first preload portion 40 is arranged at the end portion of the holder 20, the holder 20 and the first preload portion 40 are arranged between the pair of side surface portions 32 of the first support portion 30. Therefore, the assembly work of the optical unit 1 can be facilitated.

In the present embodiment, an example in which the first magnet 111 and the second magnet 121 are arranged after step S3 is shown. However, the timing at which the first magnet 111 and the second magnet 121 are arranged is not particularly limited. For example, the first magnet 111 may be arranged in the holder 20 before step S1. For example, the second magnet 121 may be arranged in the first support portion 30 before step S3.

Figure 16:
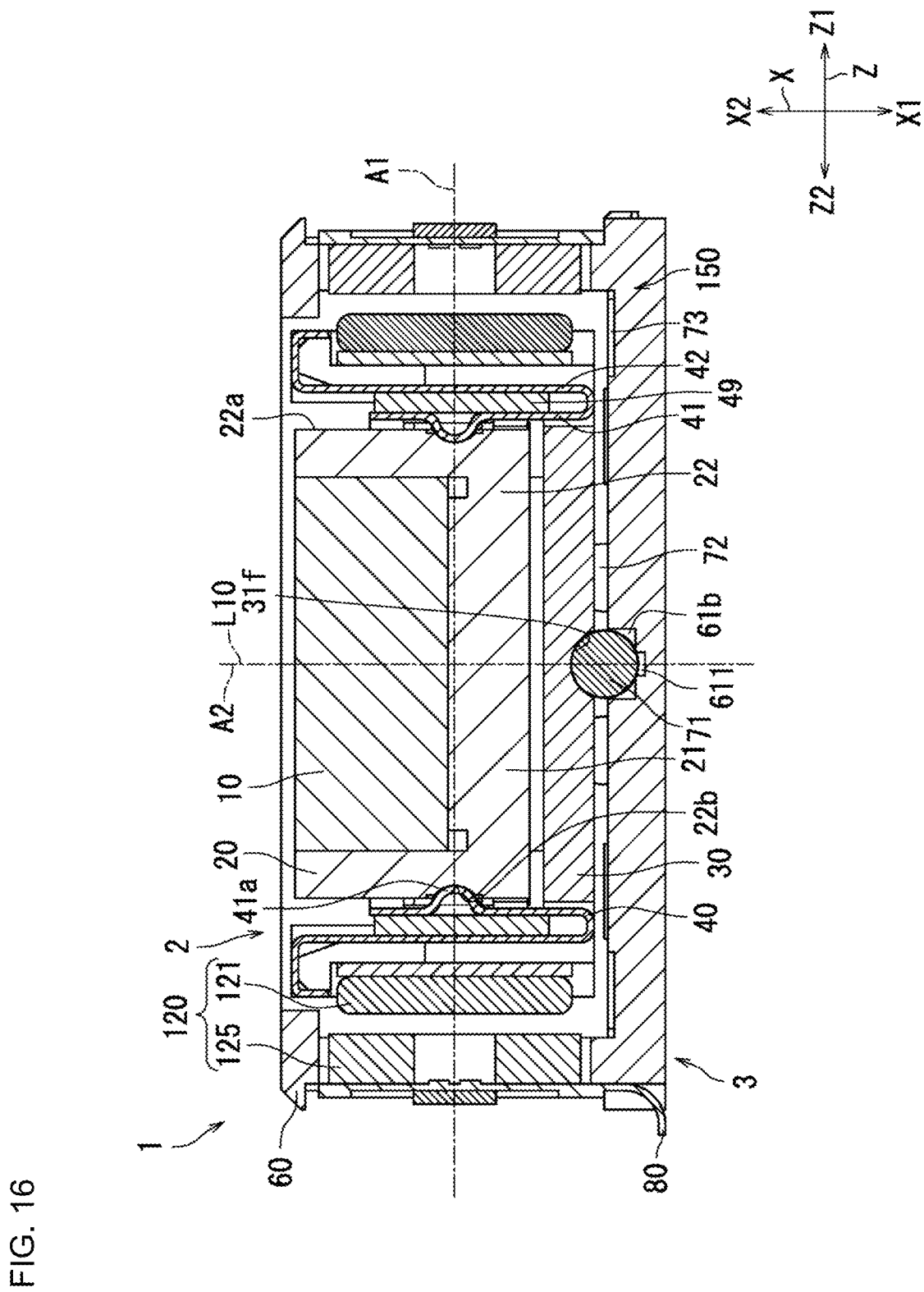
FIG. 16 is a cross-sectional view showing a structure of an optical unit according to a first modification of the present embodiment.

First to third modifications of the present embodiment will be described below with reference to FIGS. 16 to 18. Hereinafter, differences from the present embodiment shown in FIGS. 1 to 15 will be mainly described.

The first modification of the embodiment of the present disclosure will be described with reference to FIG. 16. FIG. 16 is a cross-sectional view showing the structure of an optical unit 1 according to the first modification of the present embodiment. In the first modification, an example in which the first preload portion 40 further has an elastic body 49 will be described. As shown in FIG. 16, the first preload portion 40 has the elastic body 49 arranged between the first surface portion 41 and the second surface portion 42. The elastic body 49 has elasticity. Therefore, it is possible to adjust the resonance frequency of the first preload portion 40. For example, by changing the material, size, and hardness of the elastic body 49, it is possible to easily keep the resonance frequency of the first preload portion 40 within a desired range.

The elastic body 49 may be, for example, a gel-like member. When a member such as a gel that attenuates energy is used as the elastic body 49, the impact from the outside can be suppressed more effectively. The elastic body 49 may be made of, for example, rubber, a spring, or a sponge.

The second modification of the embodiment of the present disclosure will be described with reference to FIG. 17. FIG. 17 is a cross-sectional view schematically showing the structure of the periphery of the first preload portion 40 of an optical unit 1 according to the second modification of the present embodiment. For the sake of simplicity of the drawing, hatching is omitted in FIGS. 17 and 18. In the second modification, an example where the axial convex portion 45 of the first preload portion 40 is formed of a sphere will be described.

Figure 17:
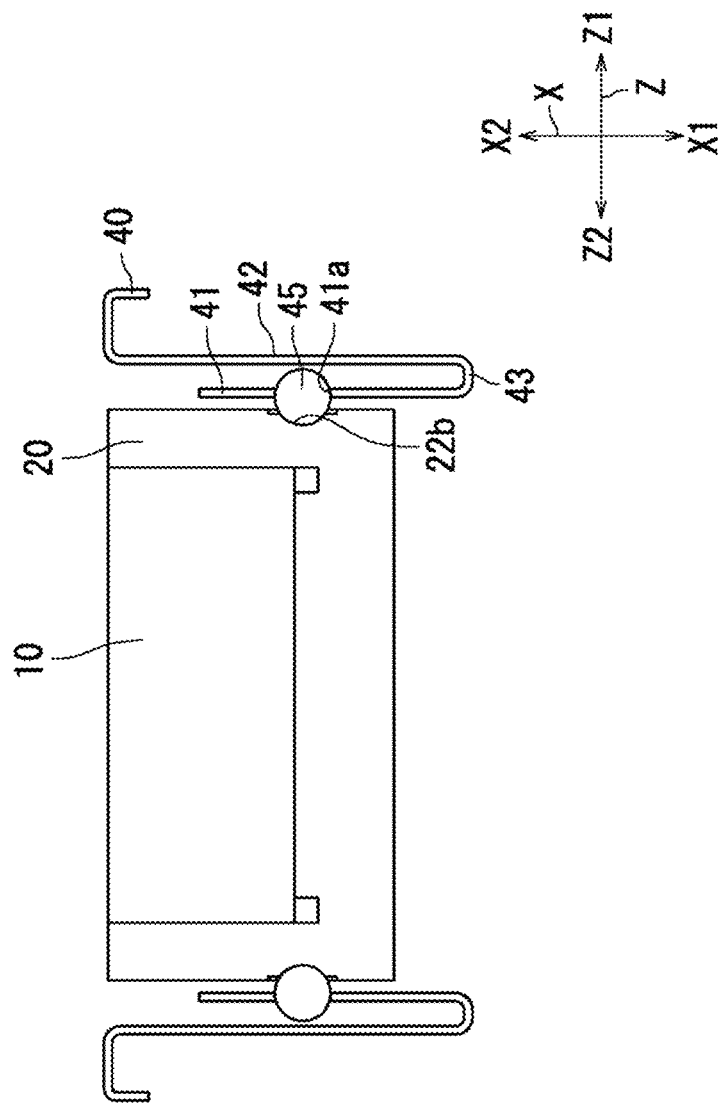
FIG. 17 is a cross-sectional view schematically showing a structure of a periphery of a first preload portion of an optical unit according to a second modification of the present embodiment.
Figure 18:
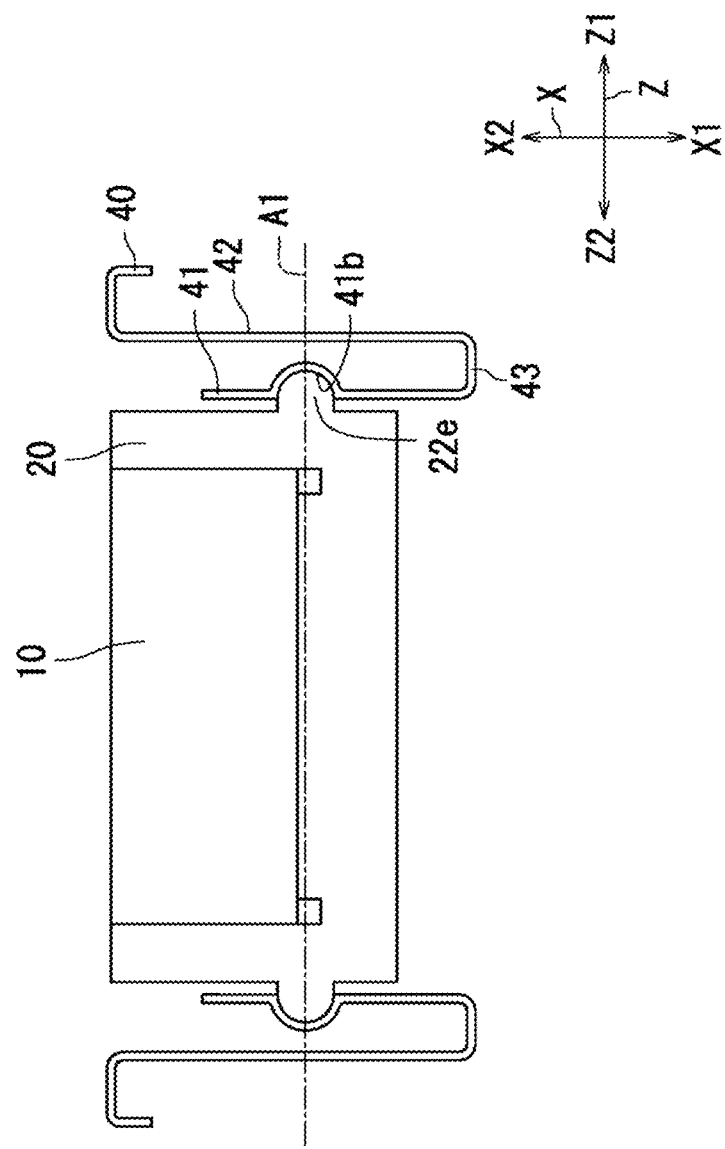
FIG. 18 is a cross-sectional view schematically showing a structure of a periphery of a first preload portion of an optical unit according to a third modification of the present embodiment.

As shown in FIG. 17, the first preload portion 40 has the axial convex portion 45. In the second modification, the axial convex portion 45 is arranged on the first surface portion 41. The axial convex portion 45 protrudes toward the holder 20. The axial convex portion 45 is formed of a sphere.

The first surface portion 41 has a through hole 41a. The through hole 41a penetrates the first surface portion 41 in the thickness direction. That is, the through hole 41a penetrates the first surface portion 41 in the third direction Z. The axial convex portion 45 may be fixed to the through hole 41a or may be fitted. The axial convex portion 45 may be fixed to the through hole 41a by using, for example, an adhesive. A part of the axial convex portion 45 is accommodated in the axial concave portion 22b. Then, the axial convex portion 45 and the axial concave portion 22b are in point contact with each other.

The third modification of the embodiment of the present disclosure will be described with reference to FIG. 18. FIG. 18 is a cross-sectional view schematically showing the structure of the periphery of the first preload portion 40 of an optical unit 1 according to the third modification of the present embodiment. In the third modification, an example where the holder 20 has an axial convex portion 22e will be described. As shown in FIG. 18, the pair of side surface portions 22 of the holder 20 have the axial convex portion 22e. The axial convex portion 22e protrudes toward the first preload portion 40 on the first swing axis A1. The axial convex portion 22e has, for example, a substantially hemispherical shape.

The first surface portion 41 of the first preload portion 40 has an axial concave portion 41b. The axial concave portion 41b is recessed to a side opposite to the holder 20. The axial concave portion 41b is arranged on the first swing axis A1. The axial concave portion 41b has a part of a concave spherical surface. A part of the axial convex portion 22e is accommodated in the axial concave portion 41b. Then, the axial convex portion 22e and the axial concave portion 41b are in point contact with each other.

The embodiment (including modifications) of the present disclosure has been described above with reference to the drawings. However, the present disclosure is not limited to the above-described embodiment, and can be implemented in various modes without departing from a gist thereof. Various disclosures can be formed by appropriately combining the plurality of components disclosed in the above embodiment. For example, some components may be removed from all components shown in the embodiment. For example, components across different embodiments may be combined as appropriate. The components in the drawings are mainly and schematically shown for facilitating better understanding, and the thickness, length, number, interval, and the like of respective illustrated components may be different from reality for the convenience of creating drawings. The material, shape, dimensions, and the like of each component described in the above embodiment are merely examples and are not particularly limited, and various modifications can be made without substantially departing from the effects of the present disclosure.

For example, in the above-described embodiment, two portions or two members having symmetrical shapes to each other are described as a "pair", but the present disclosure is not limited to this. A pair of portions or a pair of members do not need to have perfectly symmetrical shapes, and may have shapes partially different from each other. For example, the pair of side surface portions 22, the pair of first preload portions 40, the pair of side surface portions 32, or the pair of side surface portions 62 may have shapes partially different from each other.

In the above-described embodiment, an example in which each first preload portion 40 has one axial convex portion 45 is shown, but the present disclosure is not limited to this. For example, each first preload portion 40 may have two axial convex portions 45. In this case, one of the axial convex portions 45 may protrude toward the holder 20, and the other of the axial convex portions 45 may protrude toward the first support portion 30.

In the above-described embodiment, an example in which the first preload portion 40 has a convex portion (axial convex portion 45) and the holder 20 has a concave portion (axial concave portion 22b) is shown. In the above-mentioned third modification, an example in which the first preload portion 40 has a concave portion (axial concave portion 41b) and the holder 20 has a convex portion (axial convex portion 22e) is shown. However, the present invention is not limited to this. For example, the first preload portion 40 may have a convex portion and the first support portion 30 may have a concave portion. The first preload portion 40 may have a concave portion and the first support portion 30 may have a convex portion.

In the above-described embodiment, an example in which the elastic portion (first preload portion 40) has the first surface portion 41, the second surface portion 42, and the curved portion 43 is shown, but the present invention is not limited to this. For example, the elastic portion may be a rectangular parallelepiped member in which a convex portion or a concave portion is formed.

The present disclosure can be used in, for example, an optical unit, a smartphone, and a manufacturing method of an optical unit.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. An optical unit comprising:
  an optical element that changes a traveling direction of light;
  a holder that holds the optical element;
  a first support portion that supports the holder swingably about a first swing axis;
  a first swing mechanism that swings the holder with respect to the first support portion about the first swing axis; and
  an elastic portion that connects the holder and the first support portion, wherein
  the first support portion includes a pair of side surface portions that are arranged on both sides of the holder in an axial direction of the first swing axis, and a connection portion that connects the pair of side surface portions,
  the elastic portion is arranged between the holder and the side surface portions,
  the elastic portion includes a convex portion that protrudes toward at least one of the holder and the first support portion, or a concave portion that is recessed on a side opposite to at least one of the holder and the first support portion,
  at least one of the holder and the first support portion includes a concave portion that is recessed on a side opposite to the elastic portion, or a convex portion that protrudes toward the elastic portion, and the convex portion or the concave portion of the elastic portion comes into contact with the concave portion or the convex portion of at least one of the holder and the first support portion.

2. The optical unit according to claim 1, wherein
the optical element reflects light traveling on one side in a first direction to one side in a second direction intersecting the first direction, and
the first swing axis is an axis that extends along a third direction intersecting the first direction and the second direction.

3. The optical unit according to claim 1 comprising a pair of the elastic portions, wherein
the pair of elastic portions are arranged on both sides in the axial direction with respect to the holder.

4. The optical unit according to claim 1, wherein
the elastic portion includes the convex portion, and
the holder includes the concave portion.

5. The optical unit according to claim 1, wherein
the elastic portion includes
a first surface portion located on the holder side,
a second surface portion located on the first support portion side, and
a curved portion connecting the first surface portion and the second surface portion.

6. The optical unit according to claim 5, wherein
the elastic portion includes the convex portion,
the convex portion is arranged on one of the first surface portion and the second surface portion and protrudes toward one of the holder and the first support portion,
the elastic portion further includes a protrusion portion that is arranged on one of the first surface portion and the second surface portion and that protrudes toward one of the holder and the first support portion, and
one of the holder and the first support portion includes a restriction portion that restricts the protrusion portion from moving in a direction intersecting the first swing axis.

7. The optical unit according to claim 5, wherein the elastic portion further includes an elastic body arranged between the first surface portion and the second surface portion.

8. The optical unit according to claim 1, wherein
one of the first support portion and the holder includes a groove recessed on the first swing axis on a side opposite to another of the first support portion and the holder, and
the groove accommodates at least a part of the elastic portion and extends in a direction intersecting the first swing axis.

9. The optical unit according to claim 1 further comprising:
a second support portion that supports the first support portion swingably about a second swing axis that intersects the first swing axis; and
a second swing mechanism that swings the first support portion with respect to the second support portion about the second swing axis.

10. The optical unit according to claim 9, wherein
the first swing mechanism includes a first magnet arranged on the holder and a first coil arranged on the second support portion, and
the second swing mechanism includes a second magnet arranged on the first support portion and a second coil arranged on the second support portion.

11. The optical unit according to claim 10, wherein
the optical element includes a reflection surface that reflects light that travels to one side in a first direction to one side in a second direction that intersects the first direction,
the first magnet is arranged at an end portion of the holder on another side in the second direction,
the first coil is arranged at an end portion of the second support portion on another side in the second direction,
the second magnet is arranged at an end portion of the first support portion in a third direction that intersects the first direction and the second direction, and
the second coil is arranged at an end portion of the second support portion in the third direction.

12. A smartphone comprising the optical unit according to claim 1.

13. A manufacturing method of an optical unit, the optical unit including
an optical element that changes a traveling direction of light,
a holder that holds the optical element,
a first support portion that supports the holder swingably about a first swing axis,
a first swing mechanism that swings the holder with respect to the first support portion about the first swing axis, and
an elastic portion that connects the holder and the first support portion,
the first support portion including a pair of side surface portions that are arranged on both sides of the holder in an axial direction of the first swing axis, and a connection portion that connects the pair of side surface portions,
the manufacturing method of the optical unit, comprising:
a process of attaching the optical element to the holder;
a process of arranging the elastic portion at an end portion of the holder in the axial direction, and
a process of arranging the holder and the elastic portion between the pair of side surface portions of the first support portion, wherein
in the process of arranging the holder and the elastic portion,
the elastic portion is arranged between the holder and the side surface portions,
a convex portion or a concave portion included in the elastic portion comes into contact with a concave portion or a convex portion included in at least one of the holder and the first support portion,
the convex portion of the elastic portion protrudes toward at least one of the holder and the first support portion,
the concave portion of the elastic portion is recessed on a side opposite to at least one of the holder and the first support portion,
the concave portion of at least one of the holder and the first support portion is recessed on a side opposite to the elastic portion, and
the convex portion of at least one of the holder and the first support portion protrudes toward the elastic portion.

* * * * *